United States Patent [19]

Mafune et al.

[11] Patent Number: 5,451,251
[45] Date of Patent: Sep. 19, 1995

[54] INK, AND INK-JET RECORDING METHOD AND INSTRUMENT USING THE SAME

[75] Inventors: Kumiko Mafune, Kawasaki; Tsuyoshi Eida; Keiichi Murai, both of Yokohama; Yoshifumi Hattori, Yamato; Mayumi Yamamoto, Tokyo; Osamu Nishiwaki, Atsugi; Yoshihisa Takizawa, Kawasaki; Takao Yamamoto, Isehara; Akira Nagashima; Masahiko Tonogaki, both of Tokyo; Shinichi Sato, Kawasaki; Ryuji Katsuragi, Tokyo; Mikio Sanada; Hisashi Teraoka, both of Yokohama; Eriko Saito, Fujisawa, all of Japan

[73] Assignee: Canon Kabushiki Kaisha, Tokyo, Japan

[21] Appl. No.: 200,452

[22] Filed: Feb. 23, 1994

[30] Foreign Application Priority Data

| | | | |
|---|---|---|---|
| Feb. 26, 1993 | [JP] | Japan | 5-061333 |
| Jun. 24, 1993 | [JP] | Japan | 5-153632 |
| Sep. 30, 1993 | [JP] | Japan | 5-244963 |
| Oct. 1, 1993 | [JP] | Japan | 5-267814 |
| Nov. 29, 1993 | [JP] | Japan | 5-298201 |

[51] Int. Cl.⁶ .............................................. C09D 11/02
[52] U.S. Cl. .............................. 106/22 H; 106/22 K; 106/20 D
[58] Field of Search ................. 106/22 H, 22 K, 20 D

[56] References Cited

U.S. PATENT DOCUMENTS

| | | | |
|---|---|---|---|
| 4,557,761 | 12/1985 | Kobayashi et al. | 106/22 |
| 4,661,158 | 4/1987 | Kobayashi et al. | 106/22 |
| 4,732,613 | 3/1988 | Shioya et al. | 106/20 |
| 4,778,525 | 10/1988 | Kobayashi et al. | 106/20 |
| 4,804,411 | 2/1989 | Eida et al. | 106/22 |
| 4,864,324 | 9/1989 | Shirota et al. | 346/1.1 |
| 4,963,189 | 10/1990 | Hindagolla | 106/22 |
| 5,017,227 | 5/1991 | Koike et al. | 106/22 |
| 5,059,246 | 10/1991 | Yamamoto et al. | 106/22 |
| 5,062,892 | 11/1991 | Halko | 106/22 |
| 5,062,893 | 11/1991 | Adamic et al. | 106/22 |
| 5,078,790 | 1/1992 | Tochihara et al. | 106/20 |
| 5,080,716 | 1/1992 | Aoki et al. | 106/20 |
| 5,082,496 | 1/1992 | Yamamoto et al. | 106/22 |
| 5,110,356 | 5/1992 | Shirota et al. | 106/22 |
| 5,123,960 | 6/1992 | Shirota et al. | 106/22 |
| 5,125,969 | 6/1992 | Nishiwaki et al. | 106/22 |
| 5,127,946 | 7/1992 | Eida et al. | 106/22 |
| 5,130,723 | 7/1992 | Yamamoto et al. | 346/1.1 |
| 5,131,949 | 7/1992 | Tochihara et al. | 106/20 |
| 5,132,700 | 7/1992 | Tochihara et al. | 346/1.1 |
| 5,135,570 | 8/1992 | Eida et al. | 106/22 |
| 5,135,571 | 8/1992 | Shirota et al. | 106/22 |
| 5,137,570 | 8/1992 | Nishiwaki et al. | 106/22 |
| 5,139,573 | 8/1992 | Yamamoto et al. | 106/22 |
| 5,167,703 | 12/1992 | Eida et al. | 106/22 K |
| 5,178,671 | 1/1993 | Yamamoto et al. | 106/22 K |
| 5,213,613 | 5/1993 | Nagashima et al. | 106/20 R |
| 5,213,614 | 5/1993 | Eida et al. | 106/22 K |
| 5,215,577 | 6/1993 | Eida et al. | 106/22 K |
| 5,215,578 | 6/1993 | Eida et al. | 106/22 K |
| 5,216,437 | 6/1993 | Yamamoto et al. | 346/1.1 |
| 5,231,417 | 7/1993 | Shirota et al. | 346/1.1 |
| 5,250,121 | 10/1993 | Yamamoto et al. | 106/22 R |
| 5,256,194 | 10/1993 | Nishiwaki et al. | 106/22 K |
| 5,258,066 | 11/1993 | Kobayashi et al. | 106/22 R |
| 5,258,505 | 11/1993 | Eida et al. | 534/680 |
| 5,296,022 | 3/1994 | Kobayashi et al. | 106/20 D |

FOREIGN PATENT DOCUMENTS

| | | | |
|---|---|---|---|
| 0415581 | 3/1991 | European Pat. Off. | C09D 11/00 |
| 0463737 | 1/1992 | European Pat. Off. | C09D 11/00 |
| 0468647 | 1/1992 | European Pat. Off. | . |
| 0468648 | 1/1992 | European Pat. Off. | . |
| 0468649 | 1/1992 | European Pat. Off. | . |
| 0490195 | 6/1992 | European Pat. Off. | . |
| 0509668 | 10/1992 | European Pat. Off. | . |
| 0524372 | 1/1993 | European Pat. Off. | . |
| 58-36465 | 3/1983 | Japan | . |
| 59-95157 | 6/1984 | Japan | . |
| 59-100214 | 6/1984 | Japan | . |
| 59-109372 | 6/1984 | Japan | . |
| 2255876 | 10/1990 | Japan | . |
| 2296878 | 12/1990 | Japan | . |
| 3-91577 | 4/1991 | Japan | . |

*Primary Examiner*—Helene Klemanski
*Attorney, Agent, or Firm*—Fitzpatrick, Cella, Harper & Scinto

[57] ABSTRACT

Disclosed herein is an ink comprising a coloring material and a liquid medium dissolving the coloring material therein, wherein the ink comprises a dye having at least one ammonium ion as a counter ion and an ammonium salt of an inorganic or organic acid.

44 Claims, 4 Drawing Sheets

INK, AND INK-JET RECORDING METHOD AND INSTRUMENT USING THE SAME

BACKGROUND OF THE INVENTION

1. Field of the Invention

The present invention relates to an ink, and an ink-jet recording method and instruments making use of the ink. In particular, it relates to an ink which can provide images excellent in water fastness on non-coated paper such as paper for copying, paper for reporting, notepaper, letter paper, bond paper and continuous business forms, i.e., so-called plain paper, which are commonly used in offices and homes, and is excellent in solution stability and suitable for use in a system capable of high-image quality recording using bubble-jet printer, and an ink-jet recording method and instruments making use of such an ink.

The present invention also relates to an ink-jet recording ink, and particularly to an ink which can provide images excellent in water fastness on all recording materials, in particular, non-coated paper such as paper for copying, paper for reporting, notepaper, letter paper, bond paper and continuous business forms, i.e., so-called plain paper, which are commonly used in offices and homes, has an ideal black color, and is excellent in solution stability and suitable for use in a system capable of high-image quality recording using bubble-jet printer, and a recording method and instruments making use of such an ink.

Further, this invention relates to an ink capable of conducting recording free of feathering and unevenness of color strength on plain paper, and an ink-jet recording method making use of such an ink.

Still further, the present invention relates to a method of preventing the association of a dye.

Yet still further, the present invention relates to a liquid composition that is not corrosive to metal, by which the corrosion of a metal caused by a liquid kept in contact with the metal can be effectively prevented, for the purpose of enhancing the reliability of various apparatus and instruments of a structure that their metal surfaces are brought into contact with the liquid upon their use. In particular, the present invention relates to a liquid composition and an ink that are not corrosive to metal, by which in apparatus suitable for use in non-impact recording, especially, apparatus in which ink droplets are ejected to conduct recording, such as copying machines, facsimile terminal equipments, word processors, printers and plotter, the corrosion of metal parts such as heating resistors and electric conductors installed in these apparatus, which may be caused by their direct contact with ink upon their use, can be effectively prevented, and an ink-jet recording method making use of such an ink.

2. Related Background Art

Inks with greatly various manners of being composed have been hitherto reported in respect of inks for ink-jet recording. In particular, in recent years, detailed researches and developments have been made from various aspects such as compositions and physical properties of inks because of a demand for improving the water fastness of images upon recording on plain paper such as paper for copying, paper for reporting, notepaper, letter paper, bond paper and continuous business forms, which are commonly used in offices.

For example, Japanese Patent Application Laid-Open Nos. 2-296878 and 2-255876 have proposed to contain a polyamine in a water-based ink composition.

In such an ink, however, the polyamine forms a salt with a hydrophilic group in a dye contained in the ink, and so the solution stability of the ink is lowered. Therefore, there are potential problems of reduction in reliability such as clogging at the tip of an orifice, and of bronzing (association of the dye) on a recording material, which may result in unevenness of printing and/or low density. It has also been considered to contain a dissolution stabilizer in the ink for a purpose of improving the solution stability of the ink. In this case, however, it is necessary to contain a great amount of the dissolution stabilizer in the ink, so that the image quality of prints formed with such an ink becomes deteriorated.

Besides, Japanese Patent Application Laid-Open No. 3-91577 has proposed to improve the water fastness of images by providing a dye having at least one carboxyl group in which the carboxyl group is formed into an ammonium salt or a volatile substituted ammonium salt, whereby ammonia or amine vaporizes on a recorded article to form a free acid.

Even in this case, however, ammonia or amine gradually vaporizes in the ink, and so the solubility of the dye is lowered, which may often form the cause of clogging at an orifice and reduction in stability of the ink though the initial solubility of the ink is good. For the same reason, bronzing tends to occur on a recording material, in particular, on acid paper.

The color tone of the dye described in Japanese Patent Application Laid-Open No. 3-91577 is somewhat royal-purplish, and a problem of the color tone hence remains unsolved.

Such a problem of color tone have had importance with the advance of color recording. More specifically, when black-color printing is conducted, it is of course ideal for a black ink to have a black color near a primary color as much as possible. Further, full-color printing requires for attaining ideal color reproduction well-balanced that in addition to magenta, yellow and cyan inks, a black ink should produce a color near a primary color. Besides, EP 0468647 A1, EP 0468648 A1 and EP 0468649 A1 describe disazo dyes and phthalocyanine dyes having at least one carboxyl group.

Further, U.S. Pat. No. 4,963,189 describes disazo dyes having at least one carboxyl group.

However, these dyes are originally hard to be dissolved in water, so that the water fastness of prints formed from an ink containing such a dye is improved compared with the conventionally-used inks. However, these dyes tend to cause a disadvantage that when such a dye is dissolved in water or a solvent to prepare an ink, the water or solvent evaporates where a cartridge containing the ink is left over for a long period of time, for example, so that the ink becomes highly viscous, dried and lastly solidified, resulting in failure of printing (such a condition will hereinafter be called "crusting"). Similarly, they may cause a disadvantage that stable ejection of the ink cannot be conducted during printing, or in the case where after the ink is ejected from an orifice, the ejection of the ink is suspended for a certain period of time (for example, 1 minute) and a first droplet of the ink is then ejected from that orifice, resulting in uneven printing (such a condition will hereinafter be called "poor first-ejection").

U.S. Pat. No. 4,963,189, 5,062893 and 5,062,892 disclose techniques of reducing kogation, i.e. a phenomenon that some components of ink are thermally decomposed and built up on a heater element of an ink-jet head and of adding 0.2% by weight (0.02 mol/l, 0.58 mol/mol of dye) of sodium phosphate as a pH buffer to an ink. They also disclose a technique of adding an oxo anion to reduce the kogation on the heater.

The above techniques cannot provide images free of unevenness of color strength and satisfactory in print density.

With respect to recording apparatus, those of very various systems have heretofore been reported. For example, Japanese Patent Application Laid-Open No. 58-36465 discloses an ink On-Demand printing system making use of ink-containing capillary tubes having orifices through which an ink is ejected.

In such an ink On-Demand printing system, an ink-heating element is arranged in close vicinity to each of the orifices. For this reason, each ink-containing capillary tube or a heating resistor provided in the vicinity thereof is rapidly heated, and moreover transfers a large amount of thermal energy to the ink in close vicinity to the orifice, whereby a minute part of the ink is vaporized to generate bubbles in the capillary tube. In consequence, the bubbles generate a pressure wave by which an ink droplet is ejected out of the orifice on the surface of a recording material. If the position of the ink-heating element to the orifice is suitably preset, and the transfer of energy from the heating element to the ink is carefully controlled, the bubbles vanish on the ink-heating element or in the vicinity thereof before the vapor escapes from the orifice.

The service life of such a thermal ink-jet printer is known to depend on, in particular, the service lives of an electric conductor and a heating resistor. Remarkable troubles arising on such electric conductor and heating resistor are caused by cavitation damage due to vanishing of bubbles and chemical damage by ink. Therefore, in order to elongate the service life of the thermal ink-jet printer, it is desirable to prevent the fatigue of the heating resistor due to chemical change and check the damage due to the occurrence of cavitation to the minimum.

In this regard, for example, Japanese patent Application Laid-Open No. 59-109372 discloses a solution for reducing the fatigue of a heating resistor. More specifically, a heating resistor is generally covered with an inert layer for protecting it against chemical fatigue and mechanical fatigue during its operation. In this publication, a thin layer of silicon carbide, silicon oxide or aluminum oxide is disclosed as the inert layer.

Japanese patent Application Laid-Open No. 59-95157 also discloses the use of silicon-oxynitride, aluminum oxide or titanium oxide in addition to silicon dioxide as an inert layer or a protective layer, in which a layer is first formed on a orifice plate, and a heating resistor and an electric conductor are covered with these inert layers.

Further, Japanese Patent Application Laid-Open No. 58-221341 discloses that a similar inert layer formed of silicon dioxide or silicon carbide is coated on a heating resistor (tantalum/aluminum alloy) and a electric conductor (aluminum), both, formed in advance.

Moreover, Japanese patent Application Laid-Open No. 59-100214 discloses a structure of an inert layer composed of two layers of silicon carbide and silicon nitride or silicon oxide.

In each of the publications, the surface protection of the heating resistor and the like making use of the inert substances as described above has been fully satisfactory as to the fatigue properties.

However, if cracks and/or pinholes exist in the inert layer or surface-protective layer composed of the inert substance and provided on the heating resistor, the surface-protective layer has involved a problem that it cannot exhibit the desired properties. In particular, if the surface-protective layer is in contact with a liquid (for example, an ink), the ink comes into contact with the heating resistor through these cracks and/or pinholes, so that a metal making up the heating resistor is corroded by the ink, resulting in electrical disconnection of the resistor. As a result, heat is not transferred to the ink, and so a uniform size of ink droplets cannot be ejected out of an ink-jet head at an even rate and in a fixed orbit.

On the other hand, it is difficult to completely do away with the cracks and pinholes in the surface-protective layer in a practical production process of the heating resistors. There is hence a demand for early solving the above problem.

Furthermore, U.S. Pat. No. 5,062,892 also discloses inks for thermal ink-jet, which contain an oxo anion such as a phosphate, a sulfate or an oxalate. Such inks involve a problem that they dissolve surface-protective layers provided on an electric conductor and a heating resistor and cause chemical damage due to kogation, resulting in failure in ejection of ink.

SUMMARY OF THE INVENTION

It is accordingly an object of the present invention to provide a black ink and a color ink which can prevent bronzing on a recording material without adversely affecting the water fastness and quality of images when recorded on non-coated paper such as paper for copying, paper for reporting, notepaper, letter paper, bond paper and continuous business forms, i.e., so-called plain paper, which are commonly used in offices and homes, and can solve problems of clogging and storage stability, and an ink-jet recording method and instruments making use of such an ink.

Another object of the present invention is to provide an ink which provides prints good in water fastness using various kinds of plain paper, causes no clogging in an orifice without adversely affecting the quality of images even after stored for a long period of time and can ensure reliability such as storage stability of the ink, and an ink-jet recording method and instruments making use of such an ink.

A further object of the present invention is to provide an ink excellent in reliability, in which ink droplets are stably formed even when the ejection of the ink is suspended and then resumed, and no irregularity of print occurs.

A still further object of the present invention is to provide an ink which can provide images excellent in water fastness when recorded on plain paper, has an ideal black color and is excellent in solution stability, and an ink-jet recording method and instruments making use of such an ink.

A yet still further object of the present invention is to provide an ink which can provide high-quality images high in density and free of undefined or irregular feathering and can solve problems of clogging at nozzles and storage stability, and an ink-jet recording method and instruments making use of such an ink.

A yet still further object of the present invention is to provide an ink which inhibits the formation of an association state of a dye such as a J-association product in a minute nozzle of an ink-jet recording apparatus to reduce dynamic viscous resistance, and hence can conduct recording excellent in various recording properties and free of unevenness of color strength on various kinds of recording paper, and an ink-jet recording method and instruments making use of such an ink.

A yet still further object of the present invention is to provide a liquid composition that is not corrosive to metal which can solve the above problems involved in the prior art, and by which the corrosion of a metal caused by a liquid kept in contact with the metal can be prevented to the utmost.

A yet still further object of the present invention is to provide a novel ink that is not corrosive to metal, by which the corrosion of metal parts such as heating resistors installed in an ink-jet recording apparatus, which may be caused by ink, can be prevented to the utmost, so that the service life of ink-jet heads can be markedly elongated, and so the reliability of the ink-jet recording apparatus can be enhanced, and moreover the failure rate of the apparatus can be reduced to a considerable extent, and an ink-jet recording method making use of such an ink.

The above objects can be achieved by the present invention described below.

In the first aspect of the present invention, there are provided an ink comprising a coloring material and a liquid medium dissolving the coloring material therein, wherein the ink comprises a dye having at least one ammonium ion as a counter ion and the ammonium salt of an inorganic or organic acid, and an ink-jet recording method and instruments making use of such an ink.

In the second aspect of the present invention, there are provided an ink comprising a coloring material and a liquid medium dissolving the coloring material therein, wherein the ink comprises a dye having at least one ammonium ion as a counter ion and an organic amine, and an ink-jet recording method and instruments making use of such an ink.

In the third aspect of the present invention, there is provided an ink comprising a coloring material and a liquid medium dissolving the coloring material therein, wherein the coloring material comprises at least one of dyes represented by the structural formula

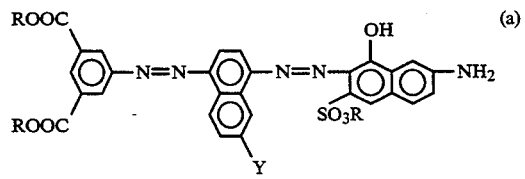

wherein R is NH$_4$ and Y is H or SO$_3$R, and at least one yellow dye selected from C.I. Acid Yellow 17:1, C.I. Acid Yellow 23, C.I. Acid Yellow 49, C.I. Acid Yellow 65, C.I. Acid Yellow 104, C.I. Acid Yellow 183, C.I. Acid yellow 155, C.I. Acid Yellow 194, C.I. Direct Yellow 86, C.I. Direct Yellow 106, C.I. Direct Yellow 142 and C.I. Direct Yellow 194, and the liquid medium comprises at least one polyhydric alcohol and an aliphatic monohydric alcohol and contains urea, an ammonium salt of an inorganic acid and a hydroxide.

In the fourth aspect of the present invention, there are provided an ink comprising at least a hardly water-soluble dye, a water-soluble organic solvent, water and an alkali metal compound, wherein the alkali metal compound is contained in a proportion of 0.8 to 6.0 moles per mole of the dye, and an ink-jet recording method which comprises applying energy, preferably, thermal energy according to recording signals to such an ink to eject the ink as droplets from a minute opening, thereby conducting recording.

In the fifth aspect of the present invention, there are provided a liquid composition and an ink that is noncorrosive to metal used in a state kept in contact with metal parts, comprising 0.1 to 1.0% by weight of a sulfate and/or 0.1 to 1.0% by weight of a hydroxide, and an ink-jet recording method making use of such an ink.

DESCRIPTION OF THE PREFERRED EMBODIMENTS

Figure 1:
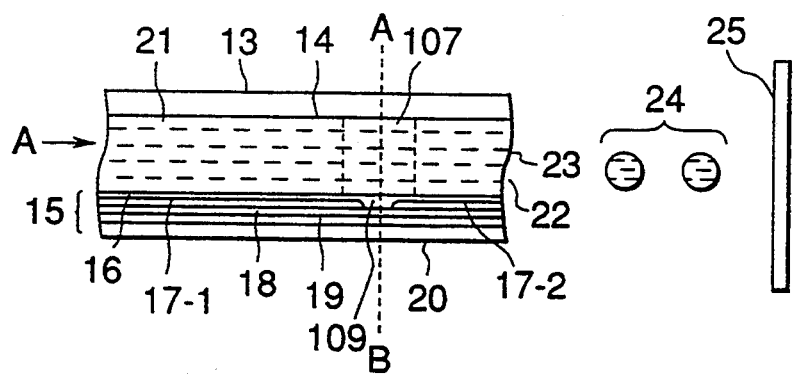
FIG. 1 is a schematic longitudinal cross-sectional view of a head used in an ink-jet recording system according to the present invention.

The present inventors have carried out an extensive investigation on various manners of ink compositions with a view toward improving the solution stability of inks which provide prints excellent in water fastness, and preventing bronzing on a recording material. As a result, it has been found that an ink comprising a coloring material and a liquid medium dissolving this material therein, wherein the ink comprises a dye having at least one ammonium ion as a counter ion and the ammonium salt of an inorganic or organic acid, is excellent in solution stability without impairing good water fastness inherent in the dye, that is, the ink causes no clogging at an orifice and is good in preventiveness against occurrence of bronzing on a recording material, thus leading to completion of the first aspect of the present invention.

The reason is believed to be attributed to the fact that since the ammonium salt of the inorganic or organic acid is dissociated, and so ammonium ion is present any time in the ink, the dye neither becomes a free acid nor deposits even if ammonia vaporizes from the orifice or during long-term storage of the ink.

Besides, upon printing, a dye immediately deposits in the form of a free acid to cause bronzing on a recording material where the ink free from the ammonium salt of the inorganic or organic acid is used. On the contrary, when the ink containing the ammonium salt of the inorganic or organic acid is used, the dye deposits at a relatively slow speed. It is therefore believed that the ink moderately penetrates into a recording material, so that no bronzing occurs.

Among such inks, inks containing ammonium carbonate or ammonium phosphate are particularly useful in achieving the object of the first aspect of the present invention because lowering in pH which may be attendant on the vaporization of ammonia does not occur.

The present inventors have carried out another extensive investigation on various manners of ink compositions with a view toward improving the solution stability of inks which provide prints excellent in water fastness, and image quality after printing to ensure its reliability. As a result, it has been found that an ink comprising a coloring material and a liquid medium dissolving this material therein, wherein the ink comprises a dye having at least one ammonium ion as a counter ion and an organic amine, is excellent in solution stability without impairing good water fastness inherent in the dye, causes no clogging at the tip (orifice) of a nozzle and provides images good in quality after the printing, thus leading to completion of the second aspect of the present invention.

The reason is believed to be attributed to the fact that although the solubility of the dye reduces if ammonia vaporizes from the tip of the nozzle or during long-term storage of the ink, and so the dye becomes a free acid, the dye does not become a free acid because the ink contains the organic amine. Therefore, the solubility of the dye increases to prevent its insolubilization.

It has also been found that if the ink further comprises a surfactant, it exhibits a synergistic effect that the association of molecules is prevented owing to the solubilizing effect of the surfactant, and the stability of the ink as a solution is hence improved, whereby clogging or crusting at the tip of the nozzle is prevented.

Further, it has been found that if the ink further comprises a nitrogen-containing compound, it exhibits another synergistic effect that the solubility of the dye is more increased.

Still further, it has been found that if the ink further comprises at least one compound of hydroxides and alkali metal salts, the solution stability of the ink is improved without impairing the water fastness inherent in the dye, that is, the ink causes no clogging at the tip of the nozzle and provides images good in quality after recording.

Yet still further, it has been found that if the ink further comprises a sulfate, the water fastness of resulting prints is also improved.

The present inventors have carried out a further extensive investigation on various manners of ink compositions with a view toward obtaining an ink which provides prints excellent in water fastness, is good in solution stability and has a black color near a primary color. As a result, it has been found that when a specific dye is used as a coloring material in combination with a dye represented by the structural formula (a), and a specific medium is used, an ideal black ink which provides high-quality images higher in density and free from undefined or irregular feathering without impairing the water fastness inherent in the dye of the structural formula (a), causes no clogging at nozzles and has good storage stability is obtained, thus leading to completion of the third aspect of the present invention.

The present inventors have carried out a still further extensive investigation on various manners of ink compositions with a view toward improving the resistance to feathering, drying characteristics and penetrability of inks on plain paper. As a result, it has been found that an ink prepared by using a hardly water-soluble dye as a coloring material in combination with an alkali metal compound is high in reliability in that the reduction in quantity of the ink ejected from an orifice is prevented, good results are obtained with respect to feathering and unevenness of color strength, and clogging is prevented without adverse influence, thus leading to completion of the fourth aspect of the present invention.

More specifically, according to the investigation by the present inventors, dye molecules in ink intend to keep a stable state from the viewpoint of energy, and hence may exist in a polymolecular form in all probability. In particular, when the ink moves at a high shear rate through a minute nozzle of an ink-jet printer or the like, this phenomenon is believed to be marked. Namely, a dye molecule interacts to a $\pi$ electron cloud of another dye molecule in the vicinity thereof through a $\pi$ electron cloud spreading on a plane to form a J-association product of the dye molecules. For this reason, the solubility of the dye molecules in the ink is more reduced, which results in viscosity increase of the ink. Then, when the alkali metal compound is added to the ink, the interaction of the $\pi$ electron clouds is inhibited to lower the formation of the J-association product. As a result, the solubility of the dye is enhanced to reduce the dynamic viscous resistance of the ink.

The present inventors have conducted a yet still further investigation with a view toward solving the above-described problem of metal corrosion. As a result, it has been found that when a sulfate and/or a hydroxide is contained in a liquid which is used in a state kept in contact with a metal part, a liquid composition that is not corrosive to metal is obtained because these compounds have film-forming ability, thus leading to completion of the fifth aspect of the present invention.

It has also been found that when the sulfate and/or the hydroxide is contained in the same manner as described above to prepare an ink that is not corrosive to metal, the corrosion of a metal part coming into contact with the ink can be effectively prevented, so that the service life of ink-jet recording apparatus can be elongated, and the reliability of recording can be enhanced. Namely, when an ink that is not corrosive to metal according to the fifth aspect of this invention is prepared by adding and mixing a so-called recording agent such as a dye or a pigment, a liquid medium dispersing the recording agent therein, and optionally additives such as a surface tension modifier and a viscosity modifier to prepare an ink, and then adding the sulfate and/or the hydroxide to the ink, and is used to conduct recording, the service life of a recording head is enhanced by leaps and bounds compared with a case where recording is conducted using the conventionally-used ink, and it is also possible to improve the reliability of recording.

In addition to the field of inks, the liquid composition that is not corrosive to metal according to the fifth aspect of the present invention may also be fully applied to technical fields involving similar problems, namely, other fields in which metals (including semiconductors) are brought into contact with a liquid for some purpose, and the corrosion of the metals attributable to this contact with the liquid is forecast.

The first aspect of the present invention will hereinafter be described in more detail with reference to preferred embodiments.

Specific examples of the ammonium salt of the inorganic or organic acid useful in the practice of the first aspect of the present invention include ammonium carbonate, ammonium phosphate (triammonium phosphate, ammonium dihydrogenphosphate, diammonium hydrogenphosphate), ammonium borate, ammonium acetate, ammonium sulfate, etc. Of these, ammonium sulfate, ammonium carbonate and ammonium phosphate are particularly preferred. In the first aspect of the present invention, the ammonium salt is not limited to these salts.

The amount of the above compound to be added to the ink may vary according to the kinds of the coloring material and other liquid media to be used. However, it is preferably within a range of from 0.01 to 10% by weight, more preferably from 0.1 to 5% by weight.

As the black dye having at least one ammonium ion as a counter ion used in the first aspect of the present invention, may be used a variety of known dyes. However, it is preferable to use a dye having at least one carboxyl group, which is represented by the following structural formula (a). Besides, those dyes shown below may also be used, to which, however, are not limited. Further, as cyan, magenta and yellow dyes, may preferably be used those dyes to be used in the second aspect which will be described subsequently.

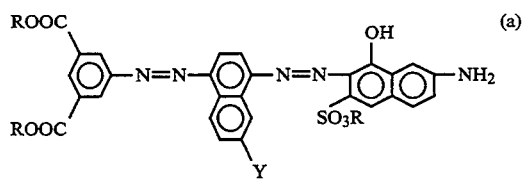
(a)

wherein R is $NH_4$ and Y is H or $SO_3R$.

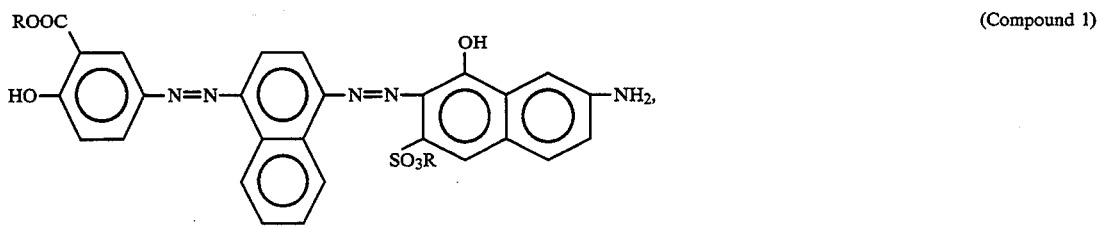
(Compound 1)

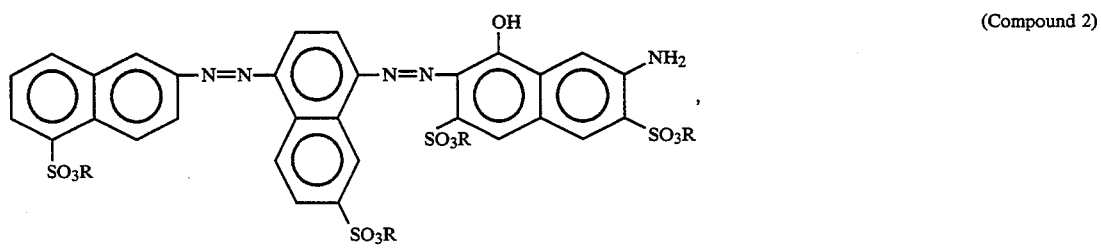
(Compound 2)

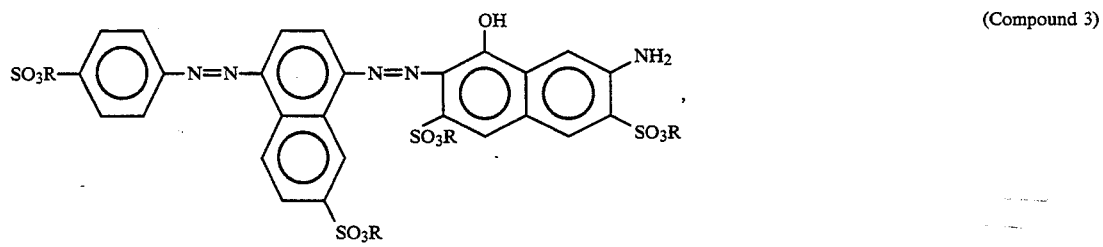
(Compound 3)

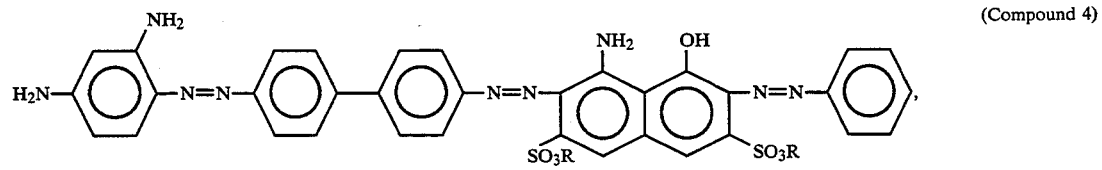
(Compound 4)

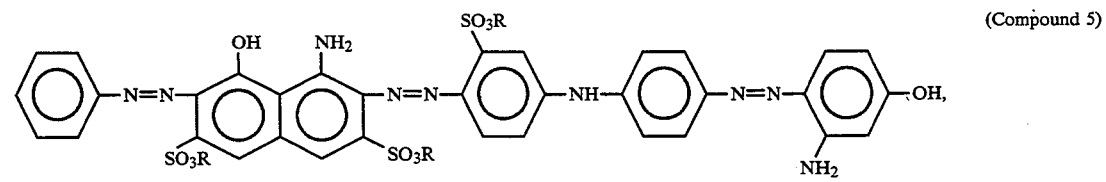
(Compound 5)

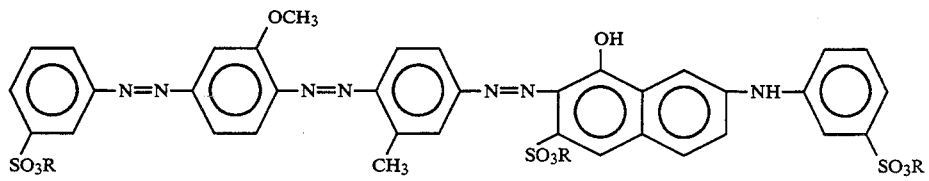
(Compound 6)
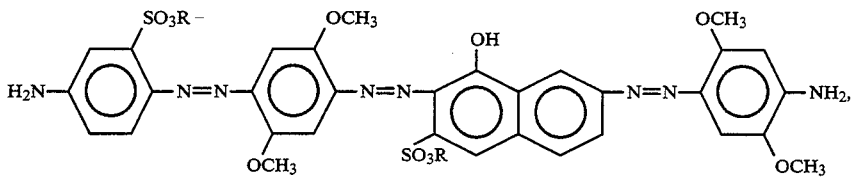
(Compound 7)
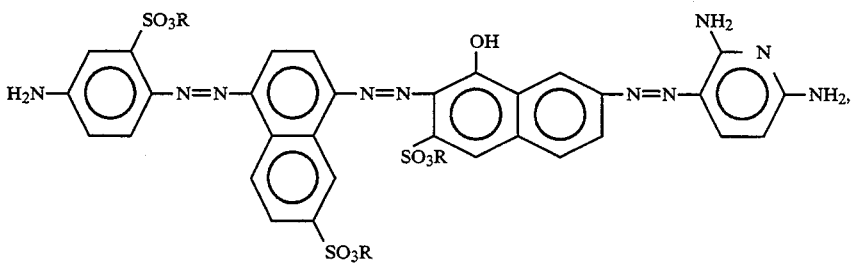
(Compound 8)
(Compound 9)
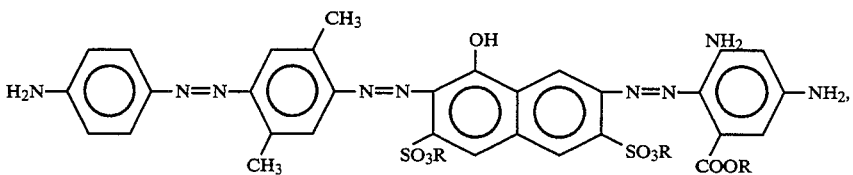
(Compound 10)
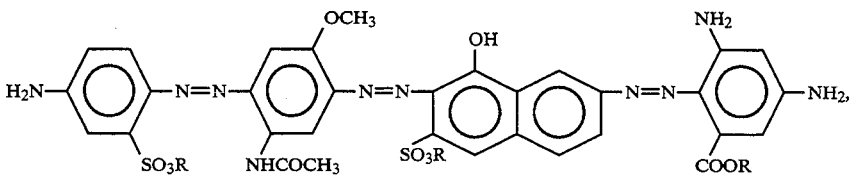
(Compound 11)
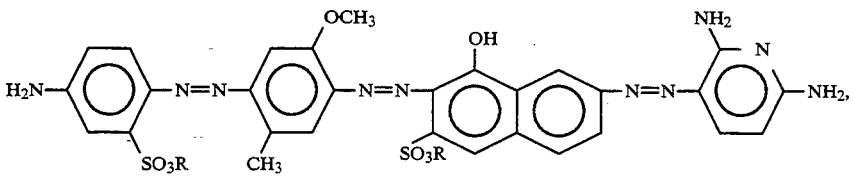
(Compound 12)
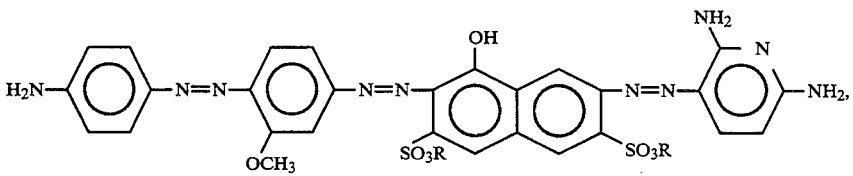
(Compound 13)
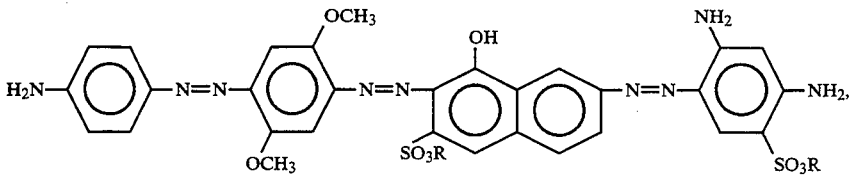

-continued
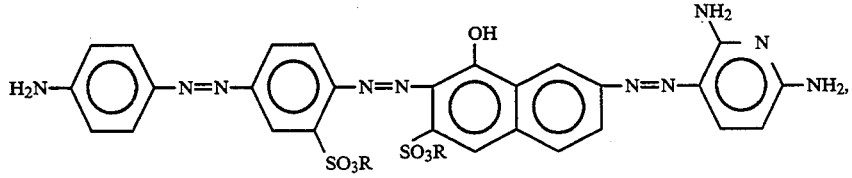
(Compound 14)
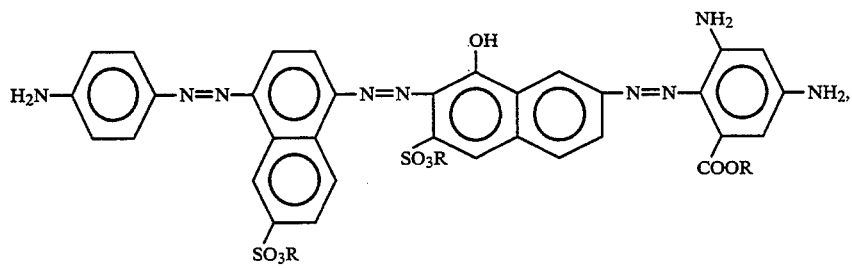
(Compound 15)
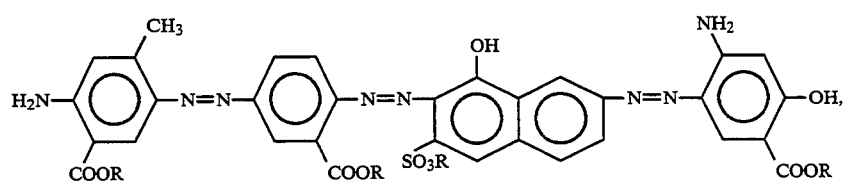
(Compound 16)
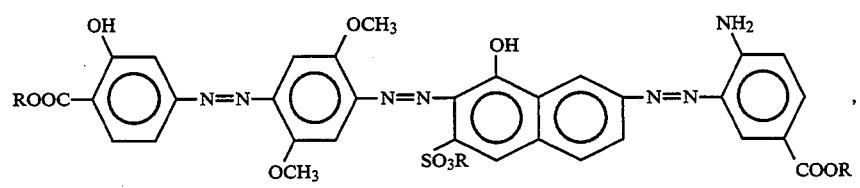
(Compound 17)
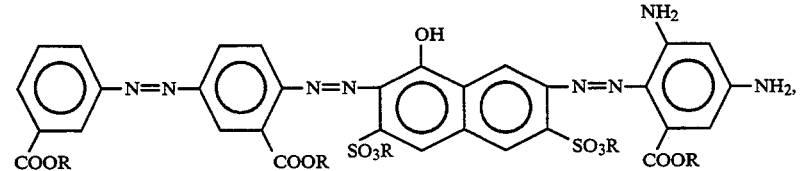
(Compound 18)
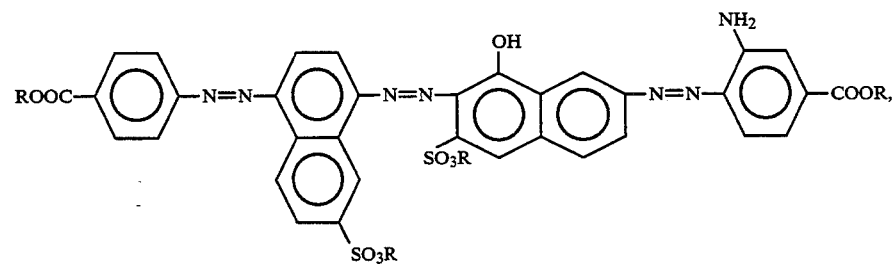
(Compound 19)
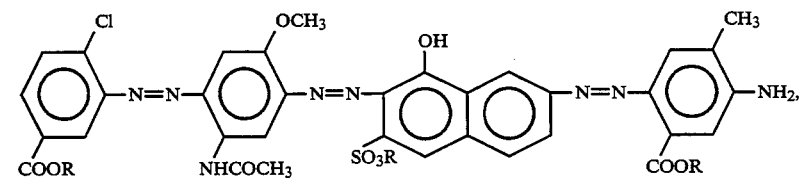
(Compound 20)
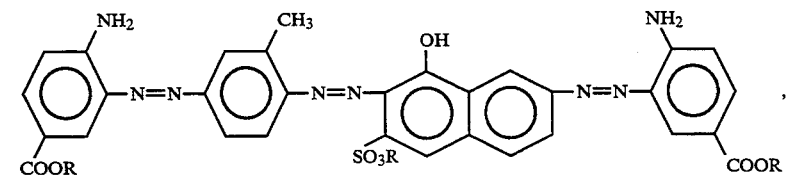
(Compound 21)

-continued

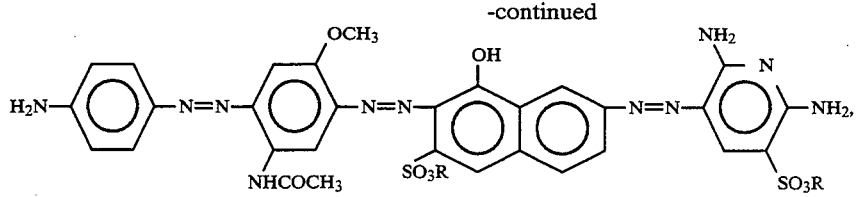
(Compound 22)

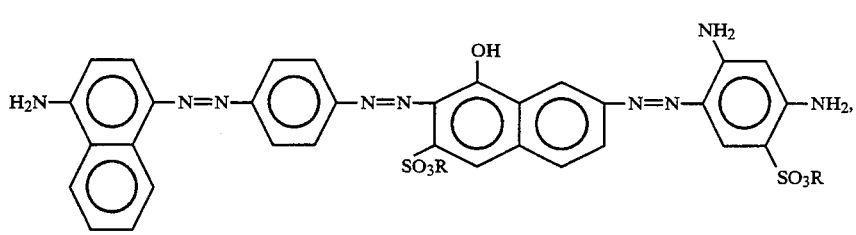
(Compound 23)

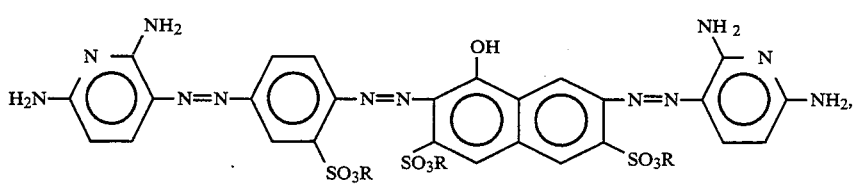
(Compound 24)

and

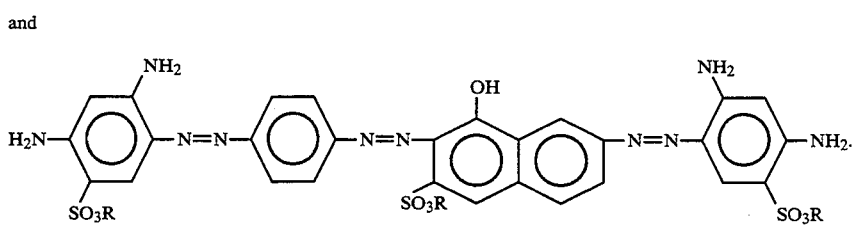
(Compound 25)

The amount of the dye to be added to the ink is within a range of from 0.1 to 15% by weight, preferably from 0.1 to 10% by weight.

The ink according to the first aspect of the present invention may contain, in addition to the above components, various additives such as water-soluble organic solvents, surfactants, pH adjustors, rust preventives, antiseptics, mildewproofing agents, antioxidants, vaporization accelerators, chelating agents and water-soluble polymers as necessary.

The liquid medium useful in the practice of the first aspect of this invention is preferably a mixed solvent of water and a water-soluble organic solvent. Specific examples of the water-soluble organic solvent include amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol and diethylene glycol; thiodiglycol; glycerol; 1,2,6-hexanetriol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; triethanolamine; sulfolane; dimethylsulfoxide; cyclic amide compounds such as 2-pyrrolidone and ε-caprolactam; imide compounds such as succinimide; and the like.

The content of the water-soluble organic solvent in the ink is preferably within a range of from 1% to 40% by weight, more preferably, from 3% to 30% by weight based on the total weight of the ink.

The content of water to be used in the ink is within a range of from 30 to 95% by weight. If the amount of water is less than 30% by weight, the solubility of the coloring material is deteriorated, and the viscosity of a resulting ink is increased. It is hence not preferable to use water in such a small amount. On the other hand, if the amount of water is greater than 95% by weight, the vaporizing components are too great to satisfy sufficient crusting property.

The ink according to the first aspect of the present invention is particularly suitable for use in an ink-jet recording system of a type that an ink is ejected by the bubbling phenomenon of the ink caused by thermal energy. This recording system has a feature that the ejection of the ink becomes extremely stable, and no satellite dots generate.

In this case, the thermal properties (for example, the specific heat, the coefficient of thermal expansion, the heat conductivity, etc.) of the inks may however be controlled in some cases.

The ink according to the first aspect of this invention is desirably controlled so as to have, as its own physical properties, a surface tension of 30 to 68 dyne/cm and a viscosity of 15 cP or lower, preferably 10 cP or lower, more preferably 5 cP or lower as measured at 25° C. from the viewpoint of solving the problem of water fastness of prints when recorded on plain paper or the like and at the same time, making the matching of the ink with an head for ink-jet good.

Accordingly, in order to control the physical properties of the ink to the above-described values and solve the problem on plain paper, it is preferred that the content of water in the ink of the first aspect of the present invention be adjusted within a range of from not less than 50% to not more than 98% by weight, preferably, from not less than 60% to not more than 95% by weight.

The second aspect of the present invention will then be described in more detail with reference to preferred embodiments.

Examples of the organic amine useful in the practice of the second aspect of the present invention include primary to tertiary amines such as monoethanolamine, diethanolamine, triethanolamine, ethylmonoethanolamine, normal-butylmonoethanol amine, dimethylethanolamine, diethylethanolamine, ethyldiethanolamine, normal-butyldiethanolamine, di-normal-butylethanolamine, monoisopropanolamine, diisopropanolamine, triisopropanolamine and the like, to which, however, are not limited.

No particular limitation is imposed on the content of the organic amine. However, it is preferably within a range of from 0.01 to 10% by weight, more preferably from 0.1 to 5.0% by weight based on the total weight of the ink.

The dyes used in the first and second aspects of the present invention are dyes having at least one ammonium ion as a counter ion. Dyes in which at least one —COOH or —COSH of each of compounds represented by the following structural formulae (b) to (e) forms a salt with an ammonium ion are preferably used, to which, however, are not limited.

The formation of the ammonium salts of the following compounds can be conducted by any method conventionally known.

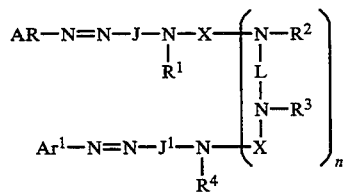
(b)

wherein Ar and $Ar^1$ are independently an aryl group or a substituted aryl group, at least one of which has at least one substituent group selected from the group consisting of —COOH and —COSH, J and $J^1$ are independently a group represented by the formula

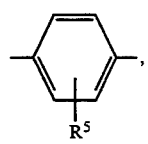
(1)

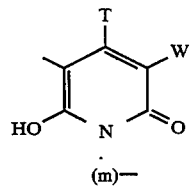
(2)

or

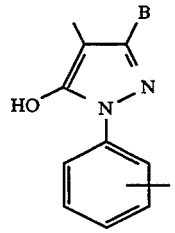
(3)

in which $R^5$ is an atom or group selected from the group consisting of a hydrogen atom, alkyl groups, substituted alkyl groups, alkoxy groups, halogen atoms, a cyano group, a ureido group, and $NHCOR^6$ ($R^6$ being a hydrogen atom, an alkyl group, a substituted alkyl group, an aryl group, a substituted aryl group, an aralkyl group or a substituted aralkyl group), T is an alkyl group, W is an atom or group selected from the group consisting of a hydrogen atom, a cyano group, $—CONR^{10}R^{11}$, pyridinium and —COOH, m is an alkylene chain having 2 to 8 carbon atoms, B is a hydrogen atom, an alkyl group or —COOH, $R^1$, $R^2$, $R^3$, $R^4$, $R^{10}$ and $R^{11}$ are independently a hydrogen atom, an alkyl group or a substituted alkyl group, L is a divalent organic bonding group, n is 0 or 1, X is a carbonyl group or a group represented by the formula

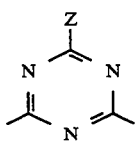
(4)

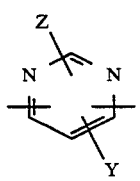
(5)

or

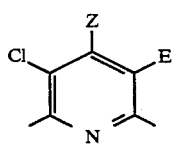
(6)

in which Z is $OR^7$, $SR^7$ or $NR^8R^9$, Y is a hydrogen atom, a chlorine atom or a cyano group, E is a chlorine atom or a cyano group, and $R^7$, $R^8$ and $R^9$ are independently a hydrogen atom, an alkenyl group, a substituted alkenyl group, an alkyl group, a substituted alkyl group, an aryl group, a substituted aryl group, an aralkyl group or a substituted aralkyl group, or $R^8$ and $R^9$ form a 5- or 6-membered ring together with the N atom to which they are bonded, with the proviso that the dye (b) has at least two groups selected from —COOH and —COSH where no $SO_3H$ is contained therein, or has the same number of groups selected from —COOH and —COSH as the number of $SO_3H$ groups where the dye (b) has one or more $SO_3H$ groups.

Of the compounds represented by the structural formula (b), are preferred those in which Ar and $Ar^1$ are independently an aryl group or a substituted aryl group having at least one —COOH as a substituent group, J and $J^1$ are independently a group represented by the formula (1) or (2), and X is a group represented by the formula (4) or (5).
Specific examples of more preferable compounds represented by the structural formula (b) are shown below.
Illustrative Compound b-1:
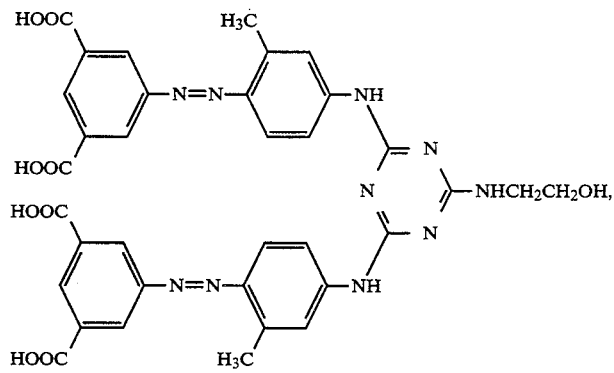
Illustrative Compound b-2:
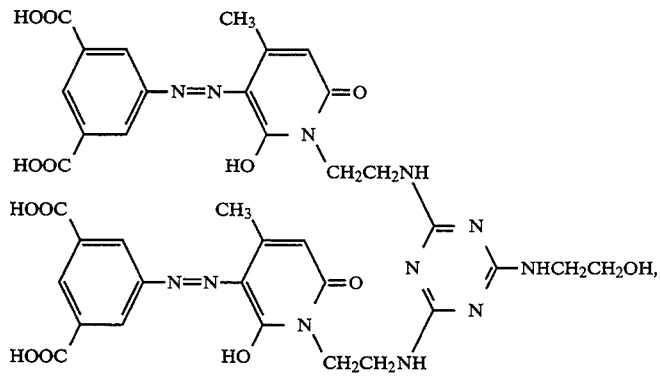
Illustrative Compound b-3:
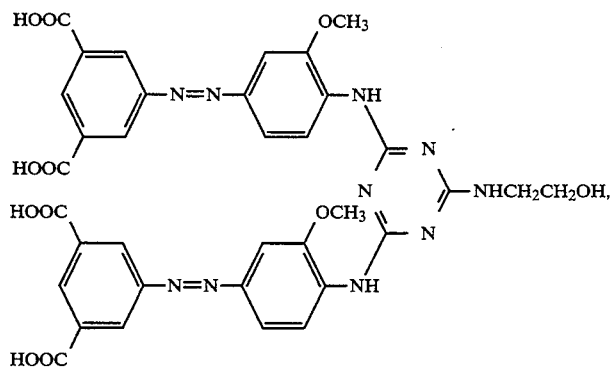
Illustrative Compound b-4:

-continued
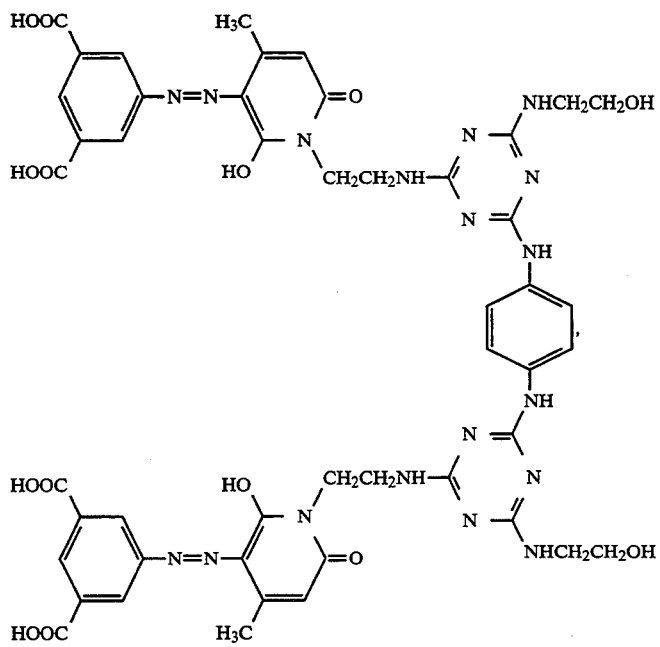
Illustrative Compound b-5:
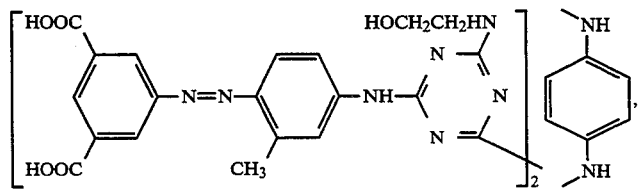
Illustrative Compound b-6:
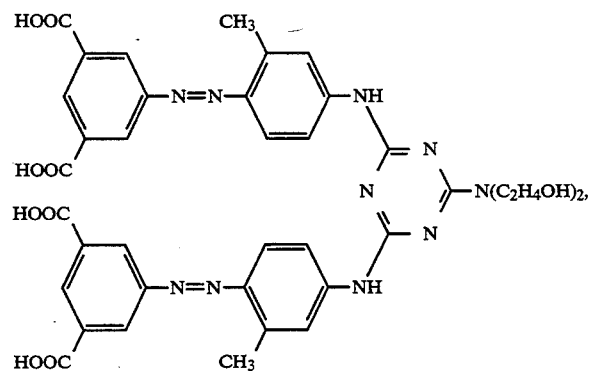
Illustrative Compound b-7:

-continued
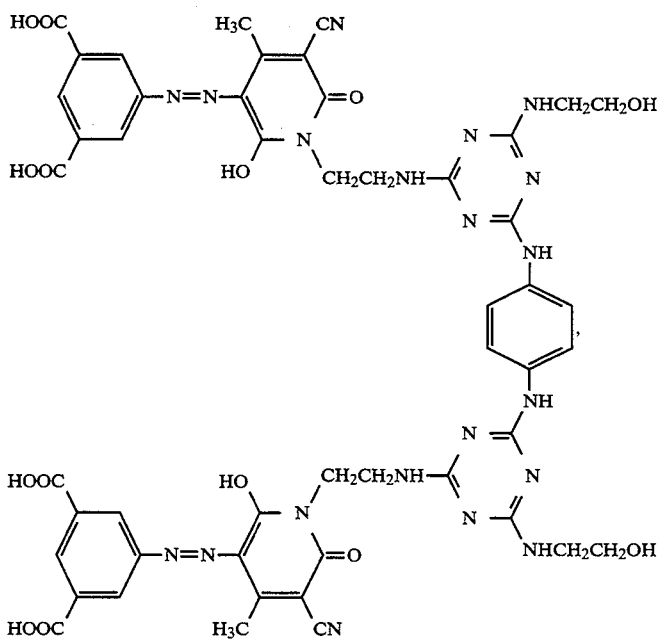
Illustrative Compound b-8:
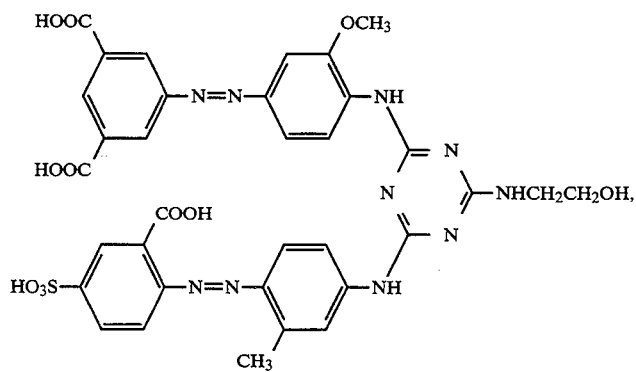
Illustrative Compound b-9:
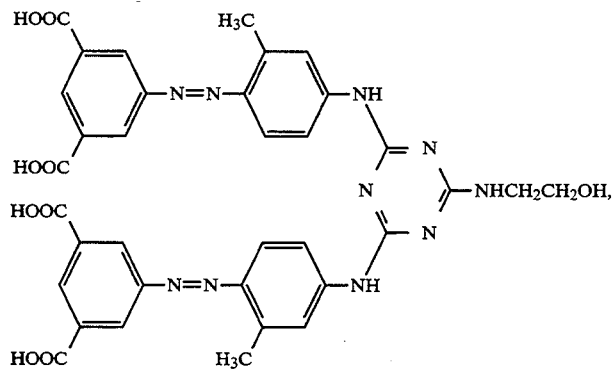
Illustrative Compound b-10:

-continued
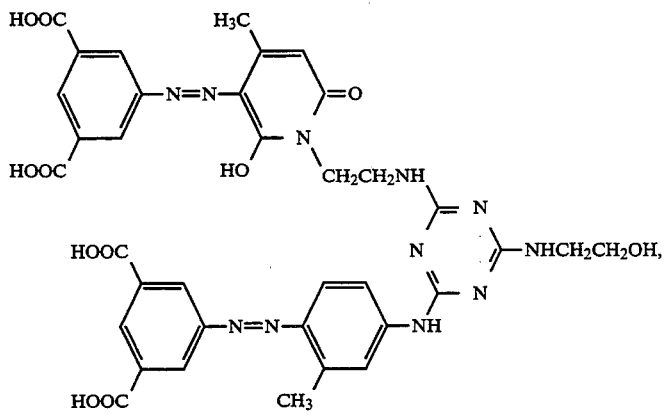
Illustrative Compound b-11:
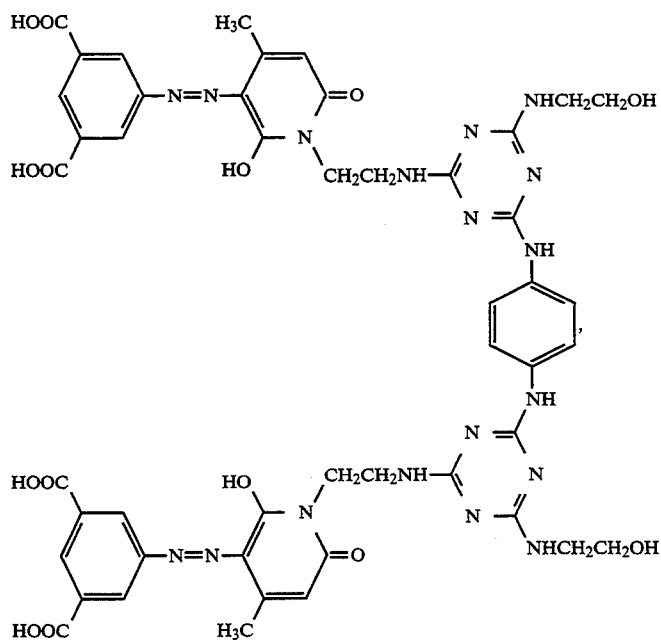
Illustrative Compound b-12:
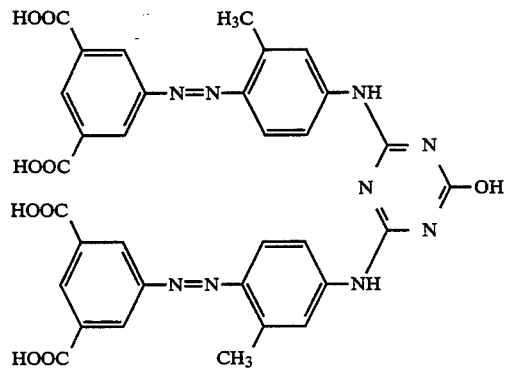
and
Illustrative Compound b-13:

-continued

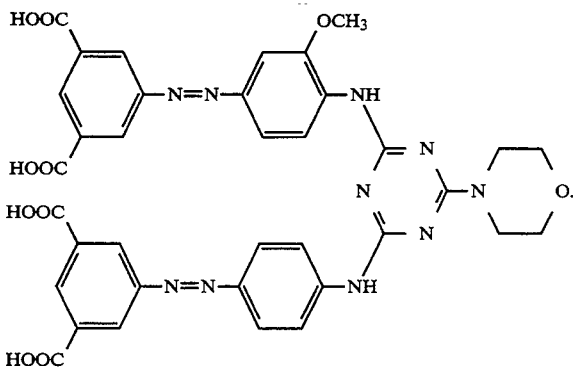

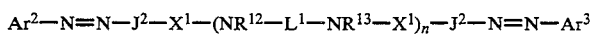
(c)

wherein $J^2$ is a group of the formula

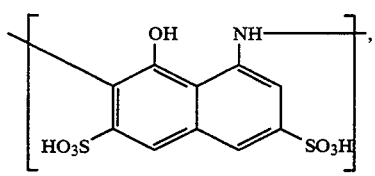, $Ar^2$ and $Ar^3$ are independently an aryl group or a substituted aryl group, at least one of which has at least one substituent group selected from the group consisting of —COOH and —COSH, $R^{12}$ and $R^{13}$ are independently a hydrogen atom, an alkyl group, a substituted alkyl group, an alkenyl group or a substituted alkenyl group, $L^1$ is a divalent organic bonding group, n is 0 or 1, $X^1$ is a carbonyl group or a group represented by the formula

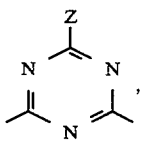 (4)

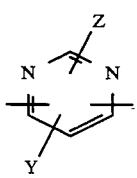 (5)

or

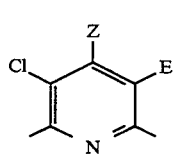 (6)

in which Z is $NR^{14}R^{15}$, $SR^{16}$ or $OR^{16}$, Y is a hydrogen atom, a chlorine atom, Z, $SR^{17}$ or $OR^{17}$, E is a chlorine atom or a cyano group, and $R^{14}$, $R^{15}$, $R^{16}$ and $R^{17}$ are independently a hydrogen atom, an alkyl group, a substituted alkyl group, an alkenyl group, a substituted alkenyl group, an aryl group, a substituted aryl group, an aralkyl group or a substituted aralkyl group, or $R^{14}$ and $R^{15}$ form a 5- or 6-membered ring together with the N atom to which they are bonded, with the proviso that the dye (c) has the same number of groups selected from the group consisting of —COOH and —COSH as the number of $SO_3H$ groups.

Of the compounds represented by the structural formula (c), are preferred those in which $Ar^2$ and $Ar^3$ are independently an aryl group or a substituted aryl group having at least one —COOH, and $X^1$ is a group represented by the formula (4) or (5).

Specific examples of more preferable compounds represented by the structural formula (c) are shown below.

Illustrative Compound c-1:

-continued
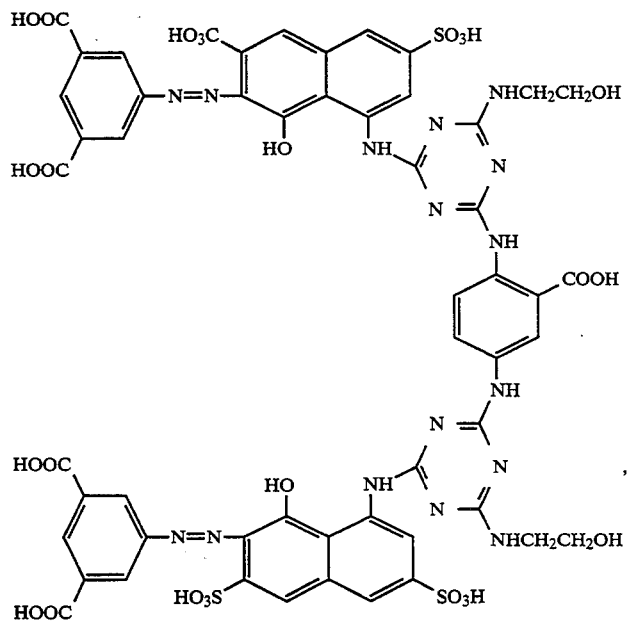
Illustrative Compound c-2:
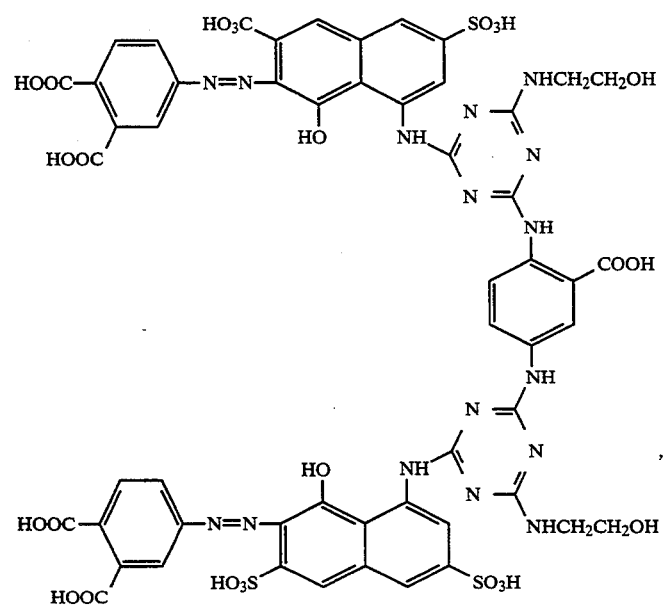
Illustrative Compound c-3:

-continued
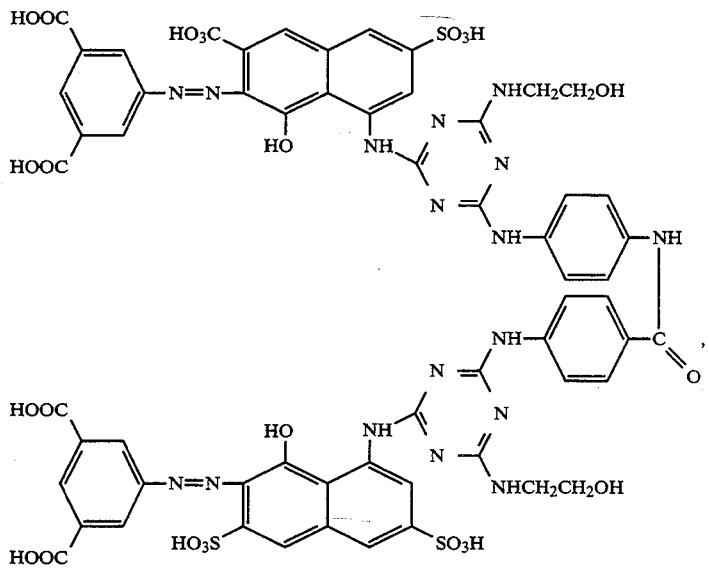
Illustrative Compound c-4:
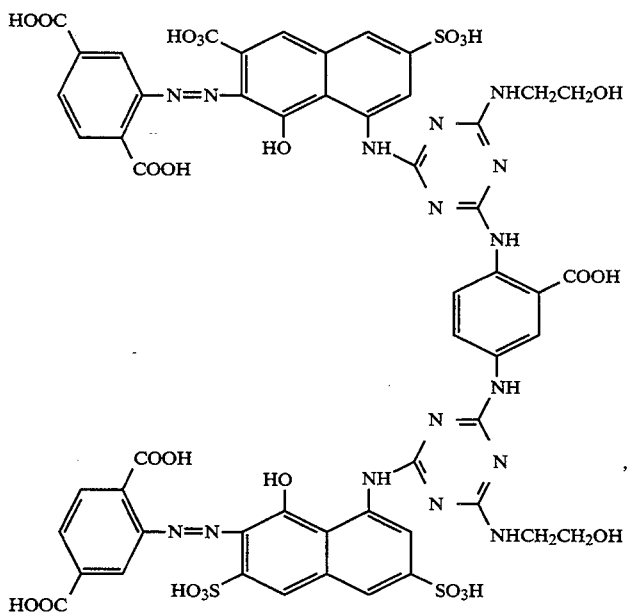
Illustrative Compound c-5:

-continued
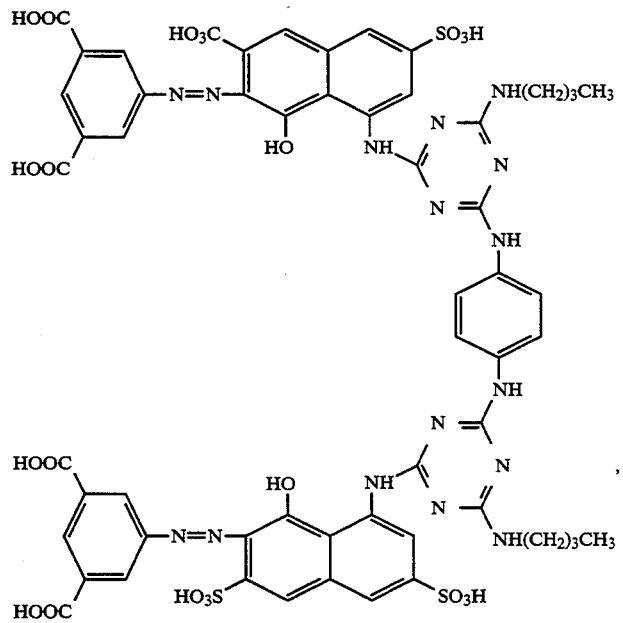
Illustrative Compound c-6:
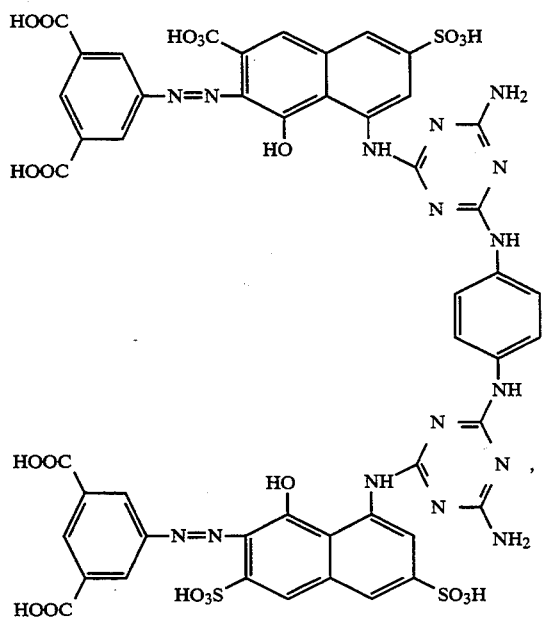
Illustrative Compound c-7:

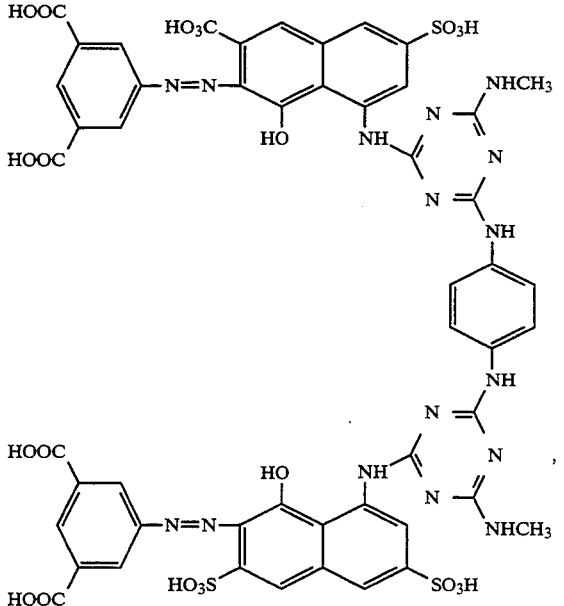

and

Illustrative Compound c-8:

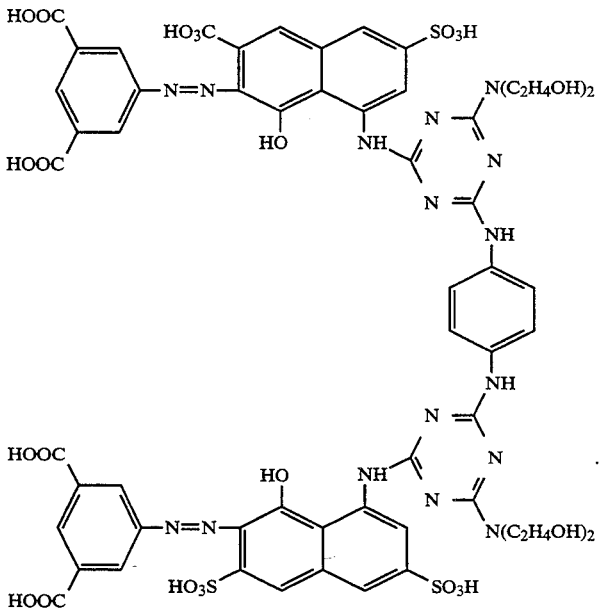

$$Pc(SO_3H)_r(SO_2-NR^{18}-L^2-NR^{19}-X^2-NR^{20}-G)_q \quad (d)$$

wherein Pc is a phthalocyanine ring containing a metal, $R^{18}$, $R^{19}$ and $R^{20}$ are independently a hydrogen atom, an alkyl group, a substituted alkyl group, an alkenyl group, a substituted alkenyl group, an aralkyl group or a substituted aralkyl group, $L^2$ is a divalent organic bonding group, $X^2$ is a carbonyl group or a group represented by the formula

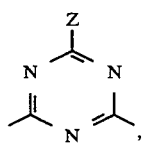 (4)

-continued

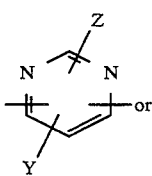 (5)

-continued

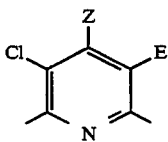
(6)

in which Z is $NR^{21}R^{22}$, $SR^{23}$ or $OR^{23}$, Y is a hydrogen atom, a chlorine atom, Z, $SR^{24}$ or $OR^{24}$, E is a chlorine atom or a cyano group, and $R^{21}$, $R^{22}$, $R^{23}$ and $R^{24}$ are independently a hydrogen atom, an alkyl group, a substituted alkyl group, an aryl group, a substituted aryl group, an aralkyl group or a substituted aralkyl group, or $R^{21}$ and $R^{22}$ form a 5- or 6-membered ring together with the N atom to which they are bonded, G is a colorless organic group substituted by one or two groups selected from the group consisting of —COSH and —COOH, and (t+q) is 3 or 4, with the proviso that the dye (d) has at least one $SO_3H$ group and the same number of groups selected from the group consisting of —COSH and —COOH as the number of $SO_3H$ groups.

Of the compounds represented by the structural formula (d), are preferred those in which $X^2$ is a group represented by the formula (4) or (5), and G is an organic acid group substituted by at least one —COOH.

Specific examples of more preferable compounds represented by the structural formula (d) are shown below.

Illustrative Compound d-1:

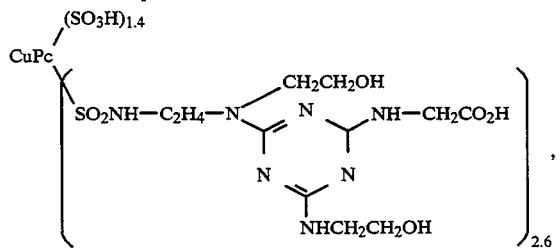

Illustrative Compound d-2:

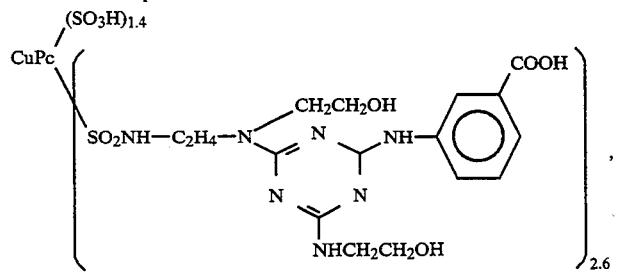

Illustrative Compound d-3:

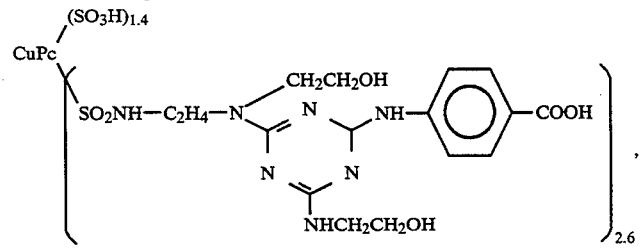

Illustrative Compound d-4:

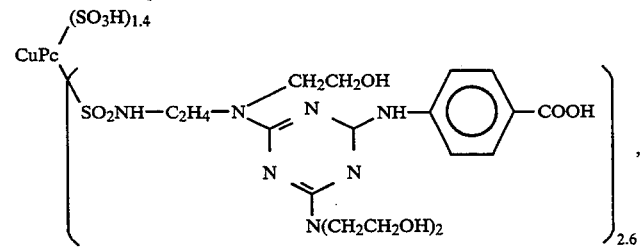

Illustrative Compound d-5:

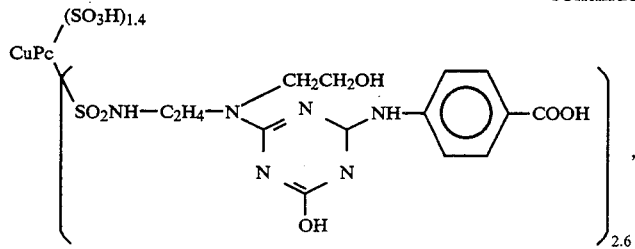

Illustrative Compound d-6:

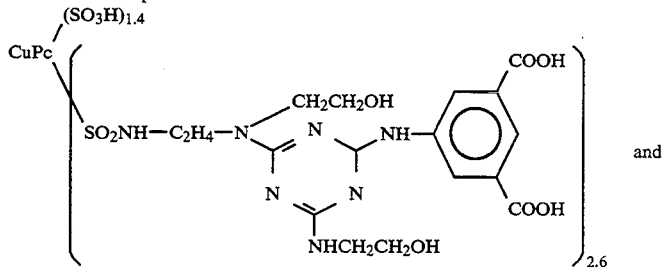
and

Illustrative Compound d-7:

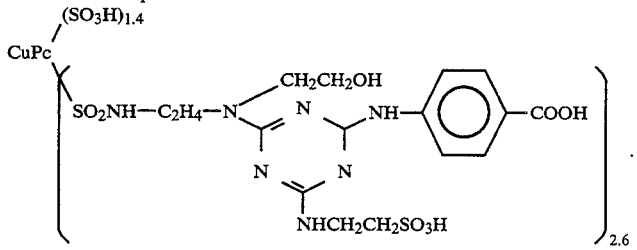

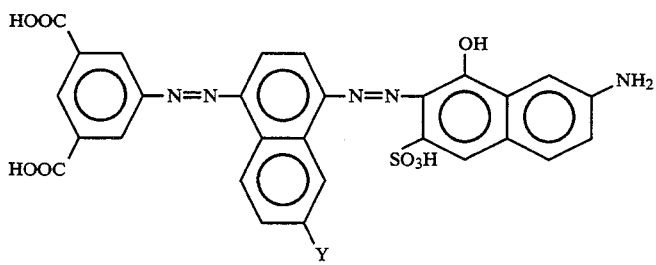
(e)

wherein Y is a hydrogen atom or $SO_3H$.

Illustrative compounds represented by the structural formula (e) are shown below.

Illustrative Compound e-1:

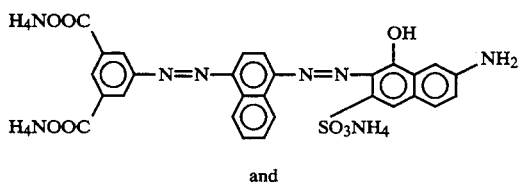
and

Illustrative Compound e-2:

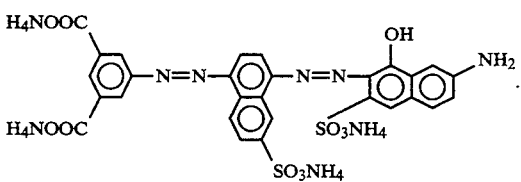

Of the dyes represented by the above formulae, the dyes of the structural formula (e) may preferably be used in combination with yellow or blue dyes in order to produce an ideal black color as a print.

Preferable examples of the yellow dyes include compounds represented by the structural formula (b), C.I. Acid Yellow 17:1, C.I. Acid Yellow 23, C.I. Acid Yellow 49, C.I. Acid Yellow 65, C.I. Acid Yellow 104, C.I. Acid Yellow 183, C.I. Acid yellow 155, C.I. Acid Yellow 194, C.I. Direct Yellow 86, C.I. Direct Yellow 106, C.I. Direct Yellow 142 and C.I. Direct Yellow 194. Preferable examples of the blue dyes include compounds represented by the structural formula (d), C.I. Acid Blue 9, C.I. Acid Blue 13, C.I. Acid Blue 68, C.I. Acid Blue 69, C.I. Acid Blue 138, C.I. Acid Blue 185, C.I. Acid Blue 249, C.I. Acid Blue 258, C.I. Direct Blue 83, C.I. Direct Blue 86, C.I. Direct Blue 87, C.I. Direct Blue 95, C.I. Direct Blue 143, C.I. Direct Blue 166, C.I. Direct Blue 176 and C.I. Direct Blue 199.

A mixing ratio of the dye of the structural formula (e) to the yellow or blue dye is preferably within a range of from 40:1 to 4:1, more preferably from 20:1 to 4:1 by weight from the viewpoint of producing an ideal black color near a primary color.

No particular limitation is imposed on the content of the dye(s) in the ink. However, it is preferably within a range of from 0.2 to 10% by weight, more preferably from 0.5 to 8.0% by weight based on the total weight of the ink.

The liquid medium used in the second aspect of the present invention for dissolving the coloring material therein is preferably a mixed solvent of water and a water-soluble organic solvent. As the water-soluble organic solvent, may be used those exemplified in the first aspect.

The content of the water-soluble organic solvent in the ink is preferably within a range of, generally, from 10 to 40% by weight, more preferably, from 10 to 30% by weight based on the total weight of the ink.

Examples of the surfactant useful in the practice of the second aspect of the present invention include anionic surfactants such as fatty acid salts, higher alcohol sulfuric ester salts, alkylbenzenesulfonates and higher alcohol phosphoric ester salts, cationic surfactants such as aliphatic amine salts and quaternary ammonium salts, nonionic surfactants such as ethylene oxide adducts of higher alcohols, ethylene oxide adducts of alkylphenols, aliphatic ethylene oxide adducts, ethylene oxide adducts of higher alcohol fatty acid esters, ethylene oxide adducts of fatty acid amides, ethylene oxide adducts of higher alkyl amines, ethylene oxide adducts of polypropylene glycol, fatty acid esters of polyhydric alcohols and alkanolamine fatty acid amides, and amino acid- and betaine-type amphoteric surfactants. No particular limitation is imposed on such a surfactant. However, nonionic surfactants such as ethylene oxide adducts of higher alcohols, ethylene oxide adducts of alkylphenols, ethylene oxide-propylene oxide copolymers and ethylene oxide adducts of acetylene glycol are preferably used. Further, it is particularly preferred that the number of moles of added ethylene oxide in the ethylene oxide adducts should be within a range of from 4 to 20.

No particular limitation is imposed on the amount of the surfactant to be added. However, it is preferably within a range of from 0.01 to 10% by weight, more preferably from 0.1 to 5.0% by weight based on the total weight of the ink. If the amount is less than 0.01% by weight, the penetrability can not be imparted to the desired extent though depending upon the kind of the surfactant used. If the amount exceeds 10% by weight, the initial viscosity of the ink is increased. It is not hence preferable to use the surfactant in such a small or great amount.

Examples of the nitrogen-containing compound useful in the practice of the second aspect of the present invention include urea, thiourea, ethyleneurea, alkylureas, alkylthioureas, dialkylureas, dialkylthioureas and the like, to which, however, are not limited. Particularly, urea is preferably used.

No particular limitation is imposed on the content of the nitrogen-containing compound in the ink. However, it is preferably within a range of from 0.01 to 20% by weight, more preferably from 0.1 to 15% by weight based on the total weight of the ink.

Examples of the hydroxide useful in the practice of the second aspect of the present invention include sodium hydroxide, lithium hydroxide, potassium hydroxide, ammonium hydroxide, magnesium hydroxide, calcium hydroxide, barium hydroxide and the like, to which, however, are not limited.

No particular limitation is imposed on the content of the hydroxide in the ink. However, it is preferably within a range of from 0.01 to 10% by weight, more preferably from 0.1 to 5.0% by weight based on the total weight of the ink.

Examples of the alkali metal salt useful in the practice of the second aspect of the present invention include lithium acetate, sodium acetate, potassium acetate, beryllium acetate, magnesium acetate, calcium acetate, lithium nitrate, sodium nitrate, potassium nitrate, beryllium nitrate, magnesium nitrate, calcium nitrate, lithium phosphate, sodium phosphate, potassium phosphate, beryllium phosphate, magnesium phosphate, calcium phosphate, lithium carbonate, sodium carbonate, potassium carbonate, beryllium carbonate, magnesium carbonate, calcium carbonate, lithium oxalate, sodium oxalate, potassium oxalate, beryllium oxalate, magnesium oxalate, calcium oxalate and the like, to which, however, are not limited.

No particular limitation is imposed on the content of the alkali metal salt in the ink. However, it is preferably within a range of from 0.01 to 10% by weight, more preferably from 0.1 to 5.0% by weight based on the total weight of the ink.

Examples of the sulfate useful in the practice of the second aspect of the present invention include sodium sulfate, lithium sulfate, potassium sulfate, ammonium sulfate, gallium sulfate, calcium sulfate, barium sulfate, beryllium sulfate, magnesium sulfate and the like, to which, however, are not limited.

No particular limitation is imposed on the content of the sulfate in the ink. However, it is preferably within a range of from 0.01 to 10% by weight, more preferably from 0.1 to 5.0% by weight based on the total weight of the ink.

A preferable combination of the additives in the second aspect of the present invention is a combination of the organic amine, the urea derivative and the surfactant. However, it is preferable to additionally use at least one of the alkali metal salts and the hydroxides in combination for the purpose of more enhancing the solution stability of the ink.

The reason is considered to be attributed to the fact that even if the ammonium salt in the dye vaporizes as ammonia during the storage of the ink, the dye does not become a free acid because the metal ion exists therein, whereby the solution stability of the ink is kept good. The use of the alkali metal salt in combination with the organic amine and the urea derivative makes the effect of the alkali metal salt heightened, whereby the reliability of the ink is improved by leaps and bounds.

Besides, when the sulfate is used in combination in addition to the alkali metal salt and the hydroxide, the water fastness of resulting prints is also improved. Therefore, such a combination is also preferred.

The ink according to the second aspect of the present invention may contain, in addition to the above components, various additives such as pH adjustors, viscosity modifiers, antiseptics, antioxidants, vaporization accelerators, rust preventives, mildewproofing agents and chelating agents as necessary.

The third aspect of the present invention will then be described in detail with reference to preferred embodiments.

The total content of the dye represented by the structural formula (a) and the above-described yellow dye, which are used as coloring materials in the third aspect of the present invention, in the ink is within a range of from 0.1 to 15% by weight, preferably from 0.1 to 10% by weight. A mixing ratio of the dye represented by the structural formula (a) to the yellow dye is preferably within a range of from 40:1 to 4:1, more preferably from 20:1 to 5:1 by weight. More specifically, if the mixing ratio of the yellow dye is lower than the lower limit, the color tone is bluish. If the mixing ratio of the yellow dye is higher than the upper limit on the contrary, the color tone is greenish. It is hence impossible to produce an ideal black color at any ratios outside the above range. The combined use of the dye represented by the structural formula (a) and the yellow dye, i.e., the use of plural kinds of dyes, makes the dissolution stability of the dyes enhanced compared with the single use of a dye, resulting in an ink hard to cause clogging at nozzles.

Preferable examples of the polyhydric alcohol useful in the third aspect of the present invention include ethylene glycol, diethylene glycol, thiodiglycol and glycerol. Besides the polyhydric alcohols, glycol ethers, glycol ether esters, amides, nitrogen-containing heterocyclic ketones and the like are generally known as liquid media. However, the polyhydric alcohols are most preferred in the third aspect of the present invention taking into consideration the fact that they are good in dissolvability for dyes, and hence cause no clogging, that they are hard to cause feathering on prints, but comparatively good in fixing ability, and moreover that there is no fear of safety such as offensive odor and toxicity compared with nitrogen-containing compounds which are generally high in dissolving power for dyes.

The ink according to the third aspect of the present invention further comprises urea. The contents of the polyhydric alcohol and urea in the ink are each preferably within a range of from 1 to 15% by weight from the viewpoint of clogging, feathering and fixing ability.

The aliphatic monohydric alcohol used in the third aspect of the present invention is essential for controlling the fixing ability of the ink on a recording material, i.e., drying ability, and has an effect of facilitating the fixing without causing undefined or irregular feathering. Examples of the aliphatic monohydric alcohol include methanol, ethyl alcohol, isopropyl alcohol, 2-butanol and the like. Its content in the ink is preferably within a range of from 0.1 to 5% by weight.

The ink according to the third aspect of the present invention further comprises the hydroxide and the ammonium salt of an inorganic acid. The single use of the hydroxide can enhance the solubility of the dyes, but deteriorates the water fastness of the dyes. Besides, the single use of the ammonium salt of the inorganic acid can also enhance the solubility of the dyes, but its effect is lower than that of the hydroxide. However, the combined use of the hydroxide and the ammonium salt of the inorganic acid results in an ink having the following effects. Namely, the solution stability of the ink is improved to an extent greater than that of the ink containing only the ammonium salt of the inorganic acid without impairing good water fastness inherent in the dyes, clogging at nozzles is hard to occur, the occurrence of bronzing on recording materials can be suppressed, and stable ejection can be achieved.

Examples of the ammonium salt of the inorganic acid include ammonium carbonate, ammonium chloride, ammonium phosphate, ammonium borate, ammonium acetate, ammonium sulfate and the like. Of these, ammonium sulfate is particularly preferred. Examples of the hydroxide include lithium hydroxide, sodium hydroxide, ammonium hydroxide and the like. Of these, sodium hydroxide and lithium hydroxide are particularly preferred. It is preferable to control the contents of these components in the ink each within a range of from 0.1 to 1.0% by weight and keep the pH of the ink 7 to 10.

The fourth aspect of the present invention will then be described in detail with reference to preferred embodiments.

Examples of the alkali metal compound useful in the fourth aspect of the present invention include lithium carbonate, sodium carbonate, potassium carbonate, rubidium carbonate, cesium carbonate, lithium hydroxide, sodium hydroxide, potassium hydroxide, rubidium hydroxide, cesium hydroxide, lithium chloride, sodium chloride, potassium chloride, rubidium chloride, cesium chloride, lithium phosphate, sodium phosphate, potassium phosphate and the like, to which, however, are not limited. The effect of preventing the formation of a J-association product of a hardly water-soluble azo dye by alkali metal ions depends on the Stokes' radius of each ion, and hence becomes greater in order of $Li > Na > K > Rb > Ce$. Namely, it is preferable to add a lithium or sodium ion for achieving the object of the fourth aspect of the present invention.

The amount of the alkali metal compound to be added to the ink is preferably within a range of from 0.8 to 6.0 mol/mol of dye. If the amount is less than 0.8 mol/mol of dye, the effect of preventing the association of the dye becomes low, and so it is difficult to achieve the object of the fourth aspect that a print free of unevenness of color strength and satisfactory in density is provided. It is more preferred that the ink should contain the alkali metal ion in a concentration not lower than 1.0 mol/mol of dye. The reason is that since a phenomenon called J-association that molecules of a dye laminate on each other in the form of a card occurs when a fluid (ink) moves at a high shear rate in a minute nozzle such as a head for ink-jet, it is necessary to interpose at least one alkali metal ion between all the dye molecules laminated in the card form in order to prevent the ink from increasing its viscosity. The upper limit of the amount of the alkali metal compound is a sum total of amounts of the alkali metal ion serving to prevent the association of the dye and an alkali metal ion capable of substituting for an ammonium ion (or organic amine) which is ionically bonded to a dissociating group in the dye molecule. The amount depends upon the pH of the ink (with the proviso that the pH of the ink is not higher than 10). The amount of the alkali metal compound to be added may vary according to the kind of the compound to be added, but is controlled by keeping the pH of the ink after its addition 10 or lower. Namely, if the pH of the ink is higher than 10, a phenomenon that a component for a ink-jet head is corroded, and the like occur.

Examples of the water-soluble organic solvent usable in admixture with water include alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and keto-alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol and diethylene glycol; thiodiglycol; glycerol; 1,2,6-hexanetriol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 2-pyrrolidone; 1,3-dimethyl-2-imidazolidinone; and the like.

The liquid media as described above may be used either singly or in any combination thereof. However, the most preferred composition of the liquid medium is a mixed solvent comprising water and at least one organic solvent, and containing at least one water-soluble, high-boiling solvent, for example, a polyhydric alcohol such as diethylene glycol, triethylene glycol, glycerol, 1,2,6-hexanetriol or thiodiglycol, or 2-pyrrolidone.

As the coloring material making up the ink according to the fourth aspect of the present invention, may be mentioned hardly water-soluble dyes. The term "hardly water-soluble" as used herein means that the solubility in water is not higher than 10%. Such a dye is desirably such an azo dye as scarcely has a hydrophilic group and contains at least one dissociating group such as a carboxyl, sulfonic or hydroxyl group on its terminal. Preferably, the azo dye has a planar molecular structure and has a $\pi$ conjugated system on its molecular plane. Preferable structural formulae (f) and (g) of such azo dyes are shown below.

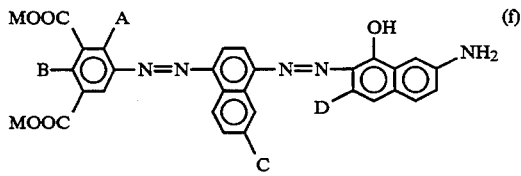

wherein A is a hydroxyl group or a hydrogen atom, B is a hydroxyl group or a hydrogen atom, C is H or $SO_3M$, D is $SO_3M$, and M is an ammonium ion or an organic amine.

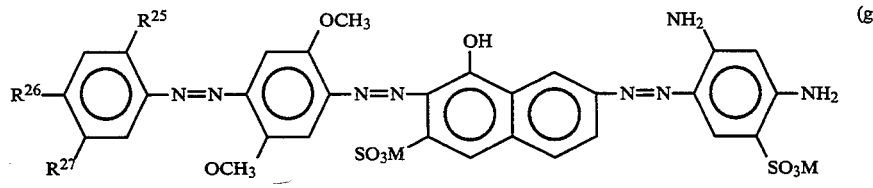

wherein $R^{25}$, $R^{26}$ and $R^{27}$ are independently a group selected from the group consisting of a hydrogen atom, alkyl groups having 1 to 4 carbon atoms, methoxy group, halogen atoms, COOM and $COOR^{28}$, $R^{28}$ is an alkyl group having 1 to 4 carbon atoms, and M is an ammonium ion or an organic amine.

Specific preferable examples of such dyes include Direct Black 51, B-2 (product of Mitsubishi Chemical Industries Limited), Pro-jet Fast Black 2 Liquid (product of ICI, Ltd.) and the like, to which, however, are not limited. Of the above dyes, Pro-jet Fast Black 2 Liquid which corresponds to a dye of the formula (f) in which A, B and C are each H, D is $SO_3NH_4$, and M is $NH_4$ is most preferred in the fourth aspect of the present invention.

The content of these coloring materials is determined depending upon the kinds of the liquid medium components, properties required of the ink and the like. However, it is generally within a range of, preferably, from 2 to 5% by weight based on the total weight of the ink.

Although the principal components of the ink according to the fourth aspect of the present invention are as described above, the ink may contain a variety of other additives such as dispersants, surfactants, viscosity modifiers, surface tension modifiers and optical whitening agents as necessary for the object of the fourth aspect of the present invention.

Specific examples thereof include viscosity modifiers such as polyvinyl alcohol, cellulose and derivatives thereof, and water-soluble resins; cationic, anionic or nonionic surfactants; surface tension modifiers such as diethanolamine and triethanolamine; pH adjustors such as buffers; mildewproofing agents; and the like.

The ink according to the fourth aspect of this invention is desirably controlled so as to have, as its own physical properties, a surface tension of 30 to 68 dyne/cm and a viscosity of 15 cP or lower, preferably 10 cP or lower, more preferably 5 cP or lower as measured at 25° C. from the viewpoint of solving the problems of ink feathering, and drying ability and penetrability of recording materials when recorded on plain paper or the like and at the same time, making the matching of the ink with a recording head for ink-jet good.

The fifth aspect of the present invention will then be described in detail with reference to preferred embodiments.

The liquid composition that is not corrosive to metal according to the fifth aspect of the present invention comprises a sulfate and/or a hydroxide which are contained in a liquid to be used in a state kept in contact with a metal. The sulfate and hydroxide used in the fifth aspect of this invention are film-forming materials as described above. They are dissolved or dispersed in a liquid medium, have a function to form a film on a wall of a flow path of liquid and do not adversely affect other ink components, recording heads and recording characteristics when added to an ink. Namely, the sulfate and hydroxide of such film-forming materials are dissolved or dispersed in a liquid medium, for example, water, water-soluble organic solvent or a mixture thereof.

The film-forming materials used in the fifth aspect of the present invention may be used singly. It is however preferable to use the sulfate and the hydroxide in combination with each other. Specific examples of the sulfate include lithium sulfate, sodium sulfate, potassium sulfate, ammonium sulfate and the like. Specific examples of the hydroxide include lithium hydroxide, sodium hydroxide, potassium hydroxide, ammonium hydroxide and the like.

The content of the film-forming materials in the ink that is not corrosive to metal according to the fifth aspect of the present invention is suitably determined according to the kinds of the liquid medium and the film-forming materials, conditions for use, relations with other additives and desired physical properties for ink, etc. However, it is desirable to contain both materials each within a range of preferably from 0.1 to 1.0% by weight, more preferably from 0.3 to 0.6% by weight.

If the proportion of the concentration of the sulfate to the concentration of the hydroxide in the ink is changed, the properties of the ink are changed. It is hence preferable to determine the proportion of the sulfate and hydroxide to be used within the above range.

For example, when tantalum (Ta) is used as protective films on an electric conductor and a heating resistor which come into contact with an ink, power to dissolve tantalum as the protective film becomes stronger if the sulfate ion concentration is as high as 1.0% by weight or more. On the other hand, if the hydroxide concentration is as high as 1.0% by weight or more, the pH of the ink exceeds 10.5, resulting in such a phenomenon that the component of a head for ink-jet is corroded. It is hence not preferable to use the sulfate and the hydroxide at such high concentrations.

If the sulfate is not added or used in an amount less than 0.1% by weight, the water fastness of images printed on a recording paper sheet tends to be deteriorated. On the other hand, if the hydroxide is not added or used in an amount less than 0.1% by weight, the association of a dye contained in the ink is facilitated, so that the viscosity of the ink increases and the volume of an droplet to be ejected from a printer head becomes small, resulting in reduction in density of the resulting print and unevenness of color strength. It is hence not preferable to use the sulfate and the hydroxide at such low concentrations.

The ink that is not corrosive to metal according to the fifth aspect of the present invention comprises, in addition to the above components, a liquid medium composed of water and a water-soluble organic solvent, and a recording agent such as a dye or a pigment. The content of the water-soluble organic solvent in the ink is controlled to 25% by weight or less, preferably 15% by weight or less, based on the total weight of the ink. The content of water is controlled within a range of from 70 to 95% by weight, preferably from 75 to 95% by weight based on the total weight of the ink. If the content of the water-soluble organic solvent exceeds 25% by weight, or the content of water is less than 70% by weight, the quality of images printed on plain paper tends to be adversely affected. It is hence not preferable to use water and the water-soluble organic solvent in any proportions outside the above range.

As the recording agent useful in the practice of the fifth aspect of the present invention, may preferably be used any dyes represented by the structural formulae (b) to (g).

Figure 2:
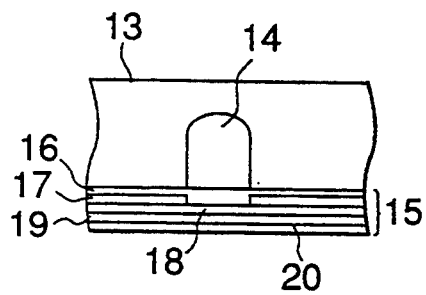
FIG. 2 is a schematic transverse cross-sectional view of the head taken along line A-B of FIG. 1.

A process in which the ink that is not corrosive to metal according to the fifth aspect of the present invention is used to conduct recording by means of a recording head as illustrated in FIG. 1 will hereinafter be described in detail. FIG. 2 is a cross-sectional view taken along line A-B of FIG. 1.

The ink that is not corrosive to metal according to the fifth aspect is introduced into a thermal action part 107 from the direction indicated by an arrow A. When an electro-thermal convertor 15 is actuated under predetermined conditions, thermal energy is momentarily generated in a heat-generating part 109, thereby momentarily heating a liquid (ink) situated in the thermal action part 107 through a thermal action surface 109. The thus-heated ink rapidly undergoes phase change and evaporates, thereby forming bubbles in the thermal action part 107 in a moment.

The thus-formed bubbles vanish with its volume rapidly shrunk at the time an electric current to the electro-thermal convertor 15 is shut off. This process is repeated.

Since the ink that is not corrosive to metal according to the fifth aspect contains the sulfate and/or the hydroxide, and hence has film-forming ability, when the ink comes into contact with the thermal action surface 109 or exists in close vicinity to the surface in this repeating process, the ink undergoes film-forming change, thereby covering the thermal action surface 109 with a film.

A shock wave caused by high-speed shrinking action of the bubbles formed in the thermal action part 107 as described above is absorbed by the film formed on the thermal action surface 109 in such a manner. If a heating resistor layer 18 and an upper layer 16 are provided, the upper layer is also protected with the film.

Such a film formed on the thermal action surface 109 may be partly or entirely damaged and separated while the shock wave is applied repeatedly. However, the next moment a new film is momentarily formed. Therefore, it can be said that during the recording process, the film is always formed on the thermal action surface 109. Accordingly, the service life of the electro-thermal convertor 15 is markedly elongated compared with the inks hitherto in use, a droplet forming frequency per unit time can be enhanced, and recording can be continuously effected for a long period of time.

In addition, since the film is dissolved or dispersed again in the ink if separated from the thermal action surface 109, the flow path at a liquid-ejecting part 22 is not clogged with the film.

As described above, the use of the ink that is not corrosive to metal according to the fifth aspect of the present invention can elongate the service life of the recording head by leaps and bounds compared with the inks hitherto in use. In particular, in the case of a full-line type recording head with a high-density multi-orifice as disclosed in DE-A-2,843,064, about 1,700 electro-thermal convertors are provided if the recording head is of a full-line type in the lateral direction of A4 size. Therefore, the failure rate of the individual electro-thermal convertors becomes remarkably high, which forms a main cause that the commodity value of the head is diminished, and moreover incurs remarkable reduction from the viewpoint of reliability. However, if the ink that is not corrosive to metal according to the fifth aspect is used in such a recording head, the service life of each electro-thermal convertor is markedly elongated, and moreover its failure rate is reduced to a significant extent, so that the head can be made reliable.

Besides the recording heads, the ink that is not corrosive to metal and liquid composition according to the fifth aspect of the present invention may also be applied to all fields in which metals (including semiconductors) are brought into contact with a liquid and may be possibly corroded by the liquid. The reliability of products such as measuring apparatus and recording apparatus in various fields can be enhanced to a significant extent.

The inks according to the first to fifth aspects of the present invention may suitably be used, in particular, in an ink-jet recording system of a type that recording is conducted by ejecting droplets of an ink by the action of thermal energy. However, the inks may also be used for general-purpose writing utensils.

As preferred methods and apparatus for conducting recording by using the inks according to the present invention, may be mentioned a method and apparatus in which thermal energy corresponding to recording signals is applied to an ink within a recording head, and ink droplets are generated in accordance with the thermal energy.

Figure 3:
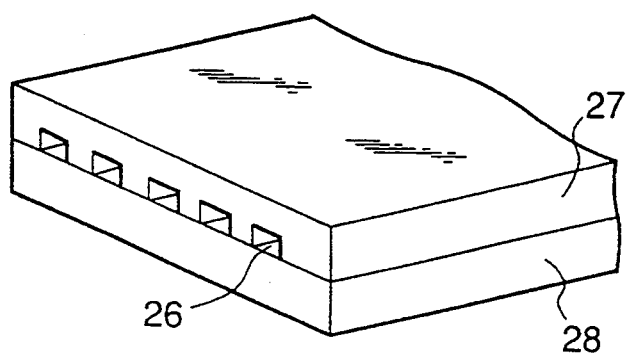
FIG. 3 is a schematic illustration showing the appearance of an illustrative multi-head which is an array of such heads as shown in FIG. 1.

Examples of the construction of an head, which is a main component of such an apparatus, are illustrated in FIGS. 1, 2 and 3.

A head 13 is formed by bonding a glass, ceramic or plastic plate or the like having a groove through which an ink is passed, to a heating head 15, which is used for thermal recording (the drawing shows a head to which, however, is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice 22 (a minute opening) and forms a meniscus 23 owing to a pressure P.

Now, upon application of electric signal information to the electrodes 17-1, 17-2, the heating head 15 rapidly generates heat at the region of thermal action surface 109 to form bubbles in the ink 21 which is in contact with this region. The meniscus 23 of the ink is projected by the action of the pressure thus produced, and the ink 21 is ejected from the orifice 22 to a recording material 25 in the form of recording droplets 24.

FIG. 3 illustrates an appearance of a multi-head composed of an array of a number of heads as shown in FIG. 1. The multi-head is formed by closely bonding a glass plate 27 having a number of channels 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line A-B of FIG. 1.

Figure 4:
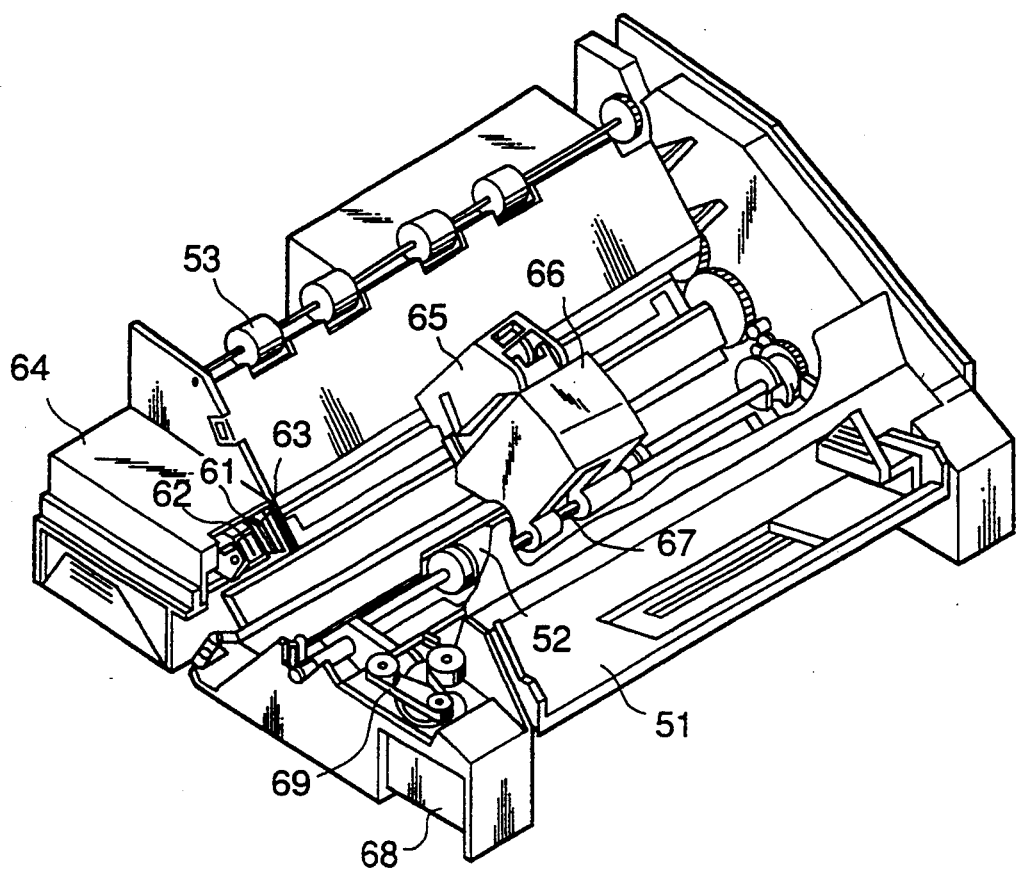
FIG. 4 is a schematic perspective view showing an illustrative ink-jet recording apparatus in which the head has been incorporated.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes to the course through which the recording head is moved.

Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved.

The above-described blade 61, cap 62 and absorbing member 63 constitute a recovery portion 64 for the recording head, where the blade 61 and the absorbing member 63 remove off water, dust and/or the like from the face of the ink-ejecting openings.

If an ink obtained by adding a phosphate singly or in combination with other additives as described in U.S. Pat. No. 5,062,892 is used, an Sn ion contained in the absorbing member 63 is dissolved out by a phosphate ion, so that chemical deposit due to kogation is formed on a thermal action surface 109. This offers a problem that the service life of the electro-thermal convertor is lowered to a significant extent.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved.

The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
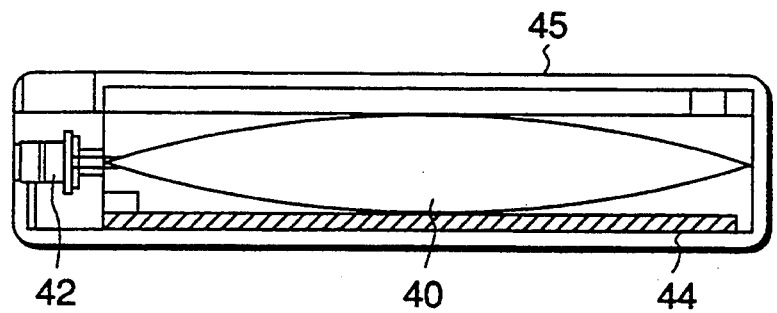
FIG. 5 is a schematic longitudinal cross-sectional view showing an ink cartridge from which an ink is fed to the head.

FIG. 5 illustrates an exemplary ink cartridge in which an ink fed to the head through an ink-feeding member, for example, a tube is contained.

Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink.

It is preferred in this invention that the ink container portion is formed of a polyolefin, in particular, polyethylene, at its surface with which the ink comes into contact.

The ink-jet recording apparatus used in this invention may not be limited to the apparatus as described above in which the head and the ink cartridge are separately provided. Therefore, a device in which these members are integrally formed as shown in FIG. 6 can also be preferably used.

Figure 6:
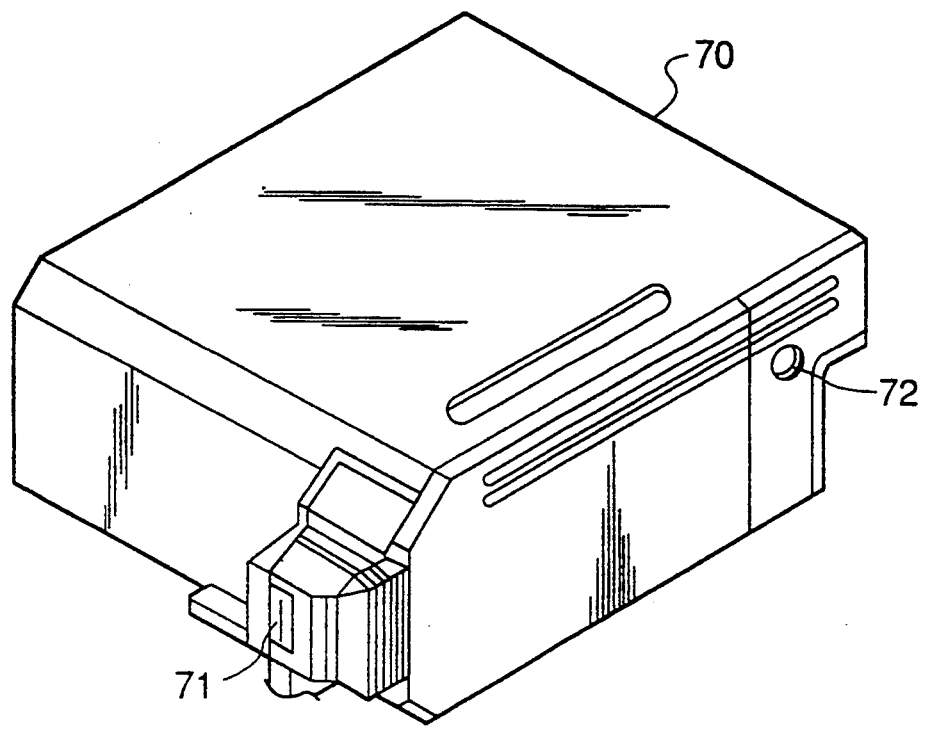
FIG. 6 is a schematic illustration showing principal parts of an ink-jet recording apparatus in which the head and the ink cartridge have been integrated with each other.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices.

In this invention, polyurethane, cellulose or polyvinyl acetal is preferably used as a material for the ink-absorbing member. Reference numeral 72 indicates an air passage for communicating the interior of the recording unit 70 with the atmosphere. This recording unit 70 can be used in place of the recording head shown in FIG. 3, and is detachably installed on the carriage 66.

The present invention will hereinafter be described more specifically by the following Examples and Comparative Examples.

Incidentally, all designations of "part" or "parts" and "%" as will be used in the following examples mean part or parts by weight and % by weight unless expressly noted.

[First Aspect]

EXAMPLES 1 to 8:

After their corresponding components as described below were mixed and thoroughly stirred into solutions, the resulting solutions were separately filtered under pressure through a "Fluoropore Filter" (trade name; product of Sumitomo Electric Industries, Ltd.) having a pore size of 0.45 μm, thereby preparing respective inks according to Examples 1 to 8 of the present invention.

| Ink composition of Example 1: | |
|---|---|
| Compound represented by the structural formula (a) (Y = H) | 2 parts |
| Triammonium phosphate | 0.5 part |
| Glycerol | 15 parts |
| Isopropyl alcohol | 3 parts |
| Water | 79.5 parts |
| Ink composition of Example 2: | |
| Compound represented by the structural formula (a) (Y = H) | 2.5 parts |
| Ammonium carbonate | 1 part |
| 2-Pyrrolidone | 10 parts |
| Water | 86.5 parts |
| Ink composition of Example 3: | |
| Compound represented by the structural formula (a) (Y = SO$_3$R) | 2.5 parts |
| Ammonium acetate | 2 parts |
| Diethylene glycol | 15 parts |
| Water | 80.5 parts |
| Ink composition of Example 4: | |
| Compound (1) | 2 parts |
| Triammonium phosphate | 1 part |
| 2-Pyrrolidone | 15 parts |
| Ethanol | 5 parts |
| Water | 77 parts |
| Ink composition of Example 5: | |
| Compound (1) | 2.5 parts |
| Ammonium carbonate | 0.5 part |
| Thiodiglycol | 10 parts |
| Urea | 5 parts |

| -continued | |
|---|---|
| Isopropyl alcohol | 4 parts |
| Water | 78 parts |
| Ink composition of Example 6: | |
| Illustrative Compound b-1 | 2.5 parts |
| Ammonium sulfate | 0.2 part |
| Glycerol | 10 parts |
| Urea | 5 parts |
| Water | 82.3 parts |
| Ink composition of Example 7: | |
| Illustrative Compound c-2 | 2.5 parts |
| Ammonium carbonate | 1 part |
| Diethylene glycol | 15 parts |
| Urea | 5 parts |
| Isopropyl alcohol | 4 parts |
| Water | 77.5 parts |
| Ink composition of Example 8: | |
| Illustrative Compound d-1 | 2 parts |
| Ammonium acetate | 2 parts |
| Thiodiglycol | 10 parts |
| Urea | 5 parts |
| Isopropyl alcohol | 4 parts |
| Water | 77 parts |

Comparative Examples 1 to 8:

In the compositions of Examples 1 to 8, their corresponding ammonium salts of the inorganic or organic acids were omitted, and instead, purified water was supplied to prepare respective inks according to Comparative Examples 1 to 8.

Using each of the inks obtained in Examples 1 to 8 and Comparative Examples 1 to 8, printing test was then conducted using, as an ink-jet recording apparatus, an On-Demand type ink-jet printer making use of a heating element as an ejection-energy source to evaluate the ink in (1) clogging tendency, (2) bronzing tendency on a recording material, (3) print quality and (4) water fastness in accordance with the following respective standards. The results are given in Table 1.

<Methods and Standards for Evaluation>

(1) Evaluation of clogging tendency (recovery property from crusting):

The printer was left over for 1 month in a constant temperature chamber at 35° C., and then for 24 hours at room temperature. After conducting recovery operation (sucking operation by pumping), printing was conducted. The clogging tendency was ranked in accordance with the following standard:

A: Normal printing state was recovered by conducting recovery operation at most 5 times;

B: Normal printing state was recovered by conducting recovery operation 6 to 10 times;

C: No ejection was observed even after conducting recovery operation 6 to 10 times, or print irregularity was noted.

(2) Evaluation of bronzing tendency on recording material:

Solid printing was conducted on commercially-available recording paper by the printer. After the resulting print was left over for at least 1 hour, the gloss of the solid printed area was observed by naked eyes to rank the bronzing tendency in accordance with the following standard:

A: The print was lusterless and even in color strength;

B: The print was partly lustrous and uneven in color strength;

C: The print was entirely lustrous and uneven in color strength.

(3) Evaluation of print quality:

English characters and numerals were printed on commercially-available paper for copying by the printer, and the resulting print was left over for at least 1 hour. The print was then observed by a microscope and naked eyes to evaluate each ink in the print quality by ranking the degrees of sharpness of the letters and whisker-like feathering occurred on the letters in accordance with the following standard:

A: The letters were sharp, and no whisker-like feathering occurred;
B: The letters were dull, and whisker-like feathering slightly occurred;
C: The letters were dull, and whisker-like feathering occurred to a great extent.

(4) Evaluation of water fastness:

After English characters and numerals and solid print areas were printed on commercially-available paper for copying by the printer, and the resulting print was left over for at least 1 hour, the density of the print was measured by a "Macbeth RD915" (trade name; manufactured by Macbeth Company). After the print was then immersed for 3 minutes in a container filled with water, it was allowed to stand and dried to measure its density again, whereby the percent retention of the density of the print was calculated. The water fastness was evaluated by ranking the value in accordance with the following standard:

A: Percent retention of the print density not lower than 80%;
B: Percent retention of the print density ranging from 66% to 79%;
C: Percent retention of the print density not higher than 65.

| Ink composition of Example 9: | |
| --- | --- |
| Illustrative Compound b-1 | 3 parts |
| Glycerol | 10 parts |
| Thiodiglycol | 5 parts |
| Diethanolamine | 1 part |
| Water | 81 parts |
| Ink composition of Example 10: | |
| Illustrative Compound c-1 | 4 parts |
| Glycerol | 7.5 parts |
| Polyethylene glycol | 7.5 parts |
| Triethanolamine | 1 part |
| Water | 80 parts |
| Ink composition of Example 11: | |
| Illustrative Compound d-1 | 4 parts |
| Glycerol | 5 parts |
| Ethylene glycol | 20 parts |
| Diethanolamine | 2 parts |
| Acetylenol EH (product of Kawaken Fine Chemicals Co., Ltd.) | 2 parts |
| Water | 67 parts |
| Ink composition of Example 12: | |
| Illustrative Compound b-2 | 3 parts |
| Glycerol | 9.5 parts |
| Ethylene glycol | 8.5 parts |
| Dimethylethanolamine | 1 part |
| Ethylene oxide-propylene oxide copolymer (Pepole AS-053X, trade name, product of Toho Chemical Industry Co., Ltd.) | 5 parts |
| Water | 73 parts |
| Ink composition of Example 13: | |
| Illustrative Compound c-2 | 6 parts |
| Thiodiglycol | 10 parts |
| Ethylene glycol | 10 parts |
| Triethanolamine | 3 parts |
| Acetylenol EH (product of Kawaken Fine Chemicals Co., Ltd.) | 3 parts |
| Urea | 10 parts |
| Water | 58 parts |
| Ink composition of Example 14: | |
| Illustrative Compound d-2 | 2.5 parts |

TABLE 1

| Evaluation item | Example | | | | | | | | Comp. Example | | | | | | | |
| --- | --- | --- | --- | --- | --- | --- | --- | --- | --- | --- | --- | --- | --- | --- | --- | --- |
| | 1 | 2 | 3 | 4 | 5 | 6 | 7 | 8 | 1 | 2 | 3 | 4 | 5 | 6 | 7 | 8 |
| Clogging tendency | A | A | A | A | A | A | A | A | B | B | B | C | B | B | B | B |
| Bronzing tendency | A | A | A | A | A | A | A | A | C | C | C | C | C | C | C | C |
| Print quality | A | A | A | A | A | A | A | A | A | A | A | A | A | A | A | A |
| Water fastness | A | A | A | A | A | A | A | A | A | A | A | A | A | A | A | A |

According to the first aspect of the present invention, as described above, there can be provided inks which can prevent bronzing on recording materials without adversely affecting the water fastness and the image quality of prints when conducting printing on so-called plain paper such as paper for copying, commonly used in offices and homes.

Further, the first aspect can provide inks which are good in anti-clogging property and storage stability.

[Second Aspect]

EXAMPLE 9 to 21

After their corresponding components as described below were mixed into solutions, the resulting solutions were separately filtered under pressure through a membrane filter (Fluoropore Filter, trade name: product of Sumitomo Electric Industries, Ltd.) having a pore size of 0.22 μm, thereby preparing respective inks according to Examples 9 to 21 of the present invention. Incidentally, with respect to the following Illustrative Compounds, all carboxyl groups and sulfonic groups were formed into salts with an ammonium ion.

| | |
| --- | --- |
| Thiodiglycol | 10.5 parts |
| Ethylene glycol | 10.5 parts |
| Monoethanolamine | 2 parts |
| Ethylene oxide-propylene oxide copolymer (Pepole AS-053X, trade name, product of Toho Chemical Industry Co., Ltd.) | 2 parts |
| Urea | 5 parts |
| Sodium hydroxide | 1 part |
| Water | 66.5 parts |
| Ink composition of Example 15: | |
| Illustrative Compound b-3 | 2.5 parts |
| Glycerol | 7.5 parts |
| Ethylene glycol | 7.5 parts |
| Diethylethanolamine | 3 parts |
| Acetylenol EH (product of Kawaken Fine Chemicals Co., Ltd.) | 3 parts |
| Urea | 5 parts |
| Lithium acetate | 2 parts |
| Water | 69.5 parts |
| Ink composition of Example 16: | |
| Illustrative Compound b-4 | 3 parts |
| Glycerol | 7 parts |
| Thiodiglycol | 7 parts |
| Diethanolamine | 3 parts |
| Ethylene oxide-propylene oxide copolymer (Pepole AS-053X, trade name, product of Toho Chemical Industry Co., Ltd.) | 1 part |
| Urea | 7 parts |
| Lithium hydroxide | 1 part |
| Sodium sulfate | 1 part |
| Water | 70 parts |

| Ink composition of Example 17: | |
|---|---|
| Illustrative Compound c-3 | 3 parts |
| Glycerol | 7 parts |
| Thiodiglycol | 7 parts |
| Diethanolamine | 3 parts |
| Acetylenol EH (product of Kawaken Fine Chemicals Co., Ltd.) | 1 part |
| Urea | 7 parts |
| Lithium acetate | 2 parts |
| Ammonium sulfate | 1 part |
| Water | 69 parts |
| Ink composition of Example 18: | |
| Illustrative Compound d-3 | 3 parts |
| Glycerol | 7.5 parts |
| Thiodiglycol | 7.5 parts |
| Triethanolamine | 1 parts |
| Ethylene oxide-propylene oxide copolymer (Pepole AS-053X, trade name, product of Toho Chemical Industry Co., Ltd.) | 1 part |
| Urea | 8 parts |
| Lithium acetate | 0.2 part |
| Sodium sulfate | 0.5 part |
| Water | 71.3 parts |
| Ink composition of Example 19: | |
| Illustrative Compound e-1 | 4 parts |
| C.I. Direct Yellow 86 | 1 part |
| Thiodiglycol | 5 parts |
| Glycerol | 8 parts |
| Dimethylethanolamine | 2 parts |
| Acetylenol EH (product of Kawaken Fine Chemicals Co., Ltd.) | 1 part |
| Urea | 10 parts |
| Lithium hydroxide | 1 part |
| Ammonium sulfate | 1 part |
| Water | 67 parts |
| Ink composition of Example 20: | |
| Illustrative Compound e-1 | 2 parts |
| C.I. Direct Yellow 86 | 1 part |
| Glycerol | 5 parts |
| Ethylene glycol | 7 parts |
| Triethanolamine | 1 part |
| Ethylene oxide-propylene oxide copolymer (Pepole AS-053X, trade name, product of Toho Chemical Industry Co., Ltd.) | 1 part |
| Urea | 5 parts |
| Lithium hydroxide | 0.5 part |
| Ammonium sulfate | 0.5 part |
| Water | 77 parts |
| Ink composition of Example 21: | |
| Illustrative Compound e-1 | 3 parts |
| C.I. Direct Yellow 86 | 0.5 part |
| C.I. Direct Blue 199 | 0.5 part |
| Glycerol | 8 parts |
| Thiodiglycol | 5 parts |
| Triethanolamine | 1 part |
| Acetylenol EH (product of Kawaken Fine Chemicals Co., Ltd.) | 2 parts |
| Urea | 10 parts |
| Lithium hydroxide | 1 part |
| Ammonium sulfate | 2 parts |
| Water | 67 parts |

Comparative Examples 9 to 21

In the compositions of Examples 9 to 21, their corresponding organic amines, surfactants, nitrogen-containing compounds, hydroxides, alkali metal salts and/or sulfates were omitted, and instead, purified water was supplied to prepare respective inks according to Comparative Examples 9 to 21.

Ink of Comparative Example 9:

An ink with diethanolamine omitted from the ink composition of Example 9.

Ink of Comparative Example 10:

An ink with triethanolamine omitted from the ink composition of Example 10.

Ink of Comparative Example 11:

An ink with diethanolamine and Acetylenol EH omitted from the ink composition of Example 11.

Ink of Comparative Example 12:

An ink with dimethylethanolamine and the ethylene oxide-propylene oxide copolymer omitted from the ink composition of Example 12.

Ink of Comparative Example 13:

An ink with triethanolamine, Acetylenol EH and urea omitted from the ink composition of Example 13.

Ink of Comparative Example 14:

An ink with monoethanolamine, the ethylene oxide-propylene oxide copolymer, urea and sodium hydroxide omitted from the ink composition of Example 14.

Ink of Comparative Example 15:

An ink with diethylethanolamine, Acetylenol EH, urea and lithium acetate omitted from the ink composition of Example 15.

Ink of Comparative Example 16:

An ink with diethanolamine, the ethylene oxide-propylene oxide copolymer, urea, sodium hydroxide and sodium sulfate omitted from the ink composition of Example 16.

Ink of Comparative Example 17:

An ink with diethanolamine, Acetylenol EH, urea, lithium acetate and ammonium sulfate omitted from the ink composition of Example 17.

Ink of Comparative Example 18:

An ink with triethanolamine, the ethylene oxide-propylene oxide copolymer, urea, lithium acetate and sodium sulfate omitted from the ink composition of Example 18.

Ink of Comparative Example 19:

An ink with dimethylethanolamine, Acetylenol EH, urea, lithium hydroxide and ammonium sulfate omitted from the ink composition of Example 19.

Ink of Comparative Example 20:

An ink with triethanolamine, the ethylene oxide-propylene oxide copolymer, urea, lithium hydroxide and sodium sulfate omitted from the ink composition of Example 20.

Ink of Comparative Example 21:

An ink with triethanolamine, Acetylenol EH, urea, lithium hydroxide and ammonium sulfate omitted from the ink composition of Example 21.

Using each of the inks obtained in Examples 9 to 21 and Comparative Examples 9 to 21, printing test was then conducted using, as an ink-jet recording apparatus, an On-Demand type ink-jet printer making use of a heating element as an ejection-energy source to evaluate the ink in (1) clogging tendency, (2) reejectability after suspension (first-ejection property) and (3) water fastness in accordance with the following respective standards. The results are given in Table 2. By the way, plain paper used in the test are the following three kinds of paper:

SK: Canon NP Dry SK (trade name, acid paper)
PB: Prober Bond Paper (trade name, neutralized paper)
XX: Xerox 4024 (trade name, neutralized paper).

<Methods and Standards for Evaluation>

(1) Evaluation of clogging tendency (recovery property from crusting):

Printing and evaluation were conducted in the same manner as in Examples 1 to 8.

(2) Evaluation of reejectability after suspension (first-ejection property):

After the printer was left over for 1 hour in an air conditioned room at 15° C. and 10% RH, ink droplets were ejected from a certain nozzle, whereby the degree of ejection stability was evaluated at the time the ejection of ink droplets from the nozzle was suspended for 1 minute and then resumed, and ranked in accordance with the following standard:

A: Normal printing could be conducted;
B: Printing could be conducted without problems in actual use though print irregularity was somewhat recognized;
C: Ejection failure or print irregularity was recognized.

(3) Evaluation of water fastness:

After an ink to be tested was charged into the printer to print English characters and numerals and solid print areas on each of the three kinds of plain paper, the printer was stopped and the resulting print was left over for at least 1 hour, followed by measurement of the density of the print by a "Macbeth RD915" (trade name; manufactured by Macbeth Company). After the print was then immersed for 5 minutes in a container filled with water, it was allowed to stand and dried to measure its density again, whereby the percent retention of the density of the print was calculated. The water fastness was evaluated by ranking the value in accordance with the following standard:

A: Percent retention of the print density not lower than 80%;
B: Percent retention of the print density ranging from 66% to 79%;
C: Percent retention of the print density not higher than 65.

TABLE 2

|  | Clogging*1 | Ejection*2 | Water fastness | | |
| --- | --- | --- | --- | --- | --- |
|  |  |  | SK | PB | XX |
| Example 9 | A | B | A | A | A |
| Example 10 | B | B | A | A | A |
| Example 11 | A | B | A | A | A |
| Example 12 | A | B | A | A | A |
| Example 13 | A | A | A | A | A |
| Example 14 | A | A | A | A | A |
| Example 15 | A | A | A | A | A |
| Example 16 | A | A | A | A | A |
| Example 17 | A | A | A | A | A |
| Example 18 | A | A | A | A | A |
| Example 19 | A | A | A | A | A |
| Example 20 | A | A | A | A | A |
| Example 21 | A | A | A | A | A |
| Comparative Example 9 | C | C | A | A | A |
| Comparative Example 10 | C | C | A | A | A |
| Comparative Example 11 | C | C | A | A | A |
| Comparative Example 12 | C | C | A | A | A |
| Comparative Example 13 | C | C | A | A | A |
| Comparative Example 14 | C | C | A | A | A |
| Comparative Example 15 | C | C | A | A | A |
| Comparative Example 16 | C | C | A | A | A |
| Comparative Example 17 | C | C | A | A | A |
| Comparative Example 18 | C | C | A | A | A |
| Comparative Example 19 | C | C | A | A | A |
| Comparative Example 20 | C | C | A | A | A |
| Comparative Example 21 | C | C | A | A | A |

Note:
*1Clogging tendency (recovery property from crusting).
*2Reejectability after suspension (first-ejection property).

As described above, when the inks, ink-jet recording methods and ink-jet recording apparatus according to the second aspect of the present invention are used, images good in water fastness can be provided on various kinds of plain paper, occurrence of clogging with ink is reduced without adversely affecting the quality of images, reejectability after suspension becomes excellent, and reliability such as storage stability can be ensured.

[Third Aspect]

EXAMPLES 22 to 27

After their corresponding components as shown in Table 3 were mixed and thoroughly stirred into solutions, the resulting solutions were separately filtered under pressure through a "Fluoropore Filter" (trade name; product of Sumitomo Electric Industries, Ltd.) having a pore size of 0.45 μm, thereby preparing respective inks according to Examples 22 to 27 of the present invention. Referential Examples 1 to 6

Inks according to Referential Examples 1 to 6 were prepared using their corresponding components as shown in Table 4 in the same manner as in Examples 22 to 27.

Using each of the inks obtained in Examples 22 to 27 and Referential Examples 1 to 6, printing test was then conducted using, as an ink-jet recording apparatus, an On-Demand type ink-jet printer making use of a heating element as an ejection-energy source to evaluate the ink in (1) color tone, (2) clogging tendency, (3) density of a print, (4) bronzing tendency on a recording material, (5) water fastness, (6) resistance to feathering and (7) fixing ability in accordance with the following respective standards. The results are given in Tables 5 and 6.

<Methods and Standards for Evaluation>

(1) Evaluation of color tone:
Solid printing was conducted on SK paper (Canon NP Dry SK) by the printer to observe the color tone of the resulting print by naked eyes.

(2) Evaluation of clogging tendency (recovery property from crusting):
Printing and evaluation were conducted in the same manner as in Examples 1 to 8.

(3) Evaluation of density of print:
Solid printing was conducted on SK paper (Canon NP Dry SK) by the printer and the resulting print was air-dried for 24 hours. Thereafter, the density of the print was measured by a Macbeth RD915 (trade name; manufactured by Macbeth Company) and ranked in accordance with the following standard:

A: Print density was not lower than 1.30;
B: Print density was 1.20 to 1.29;
C: Print density was not higher than 1.19.

(4) Evaluation of bronzing tendency on recording material:
Solid printing was conducted on SK paper (Canon NP Dry SK) by the printer. After the resulting print was left over for at least 1 hour, the gloss of the solid printed area was observed by naked eyes to rank the bronzing tendency in accordance with the following standard:

A: The print was lusterless and even in color strength;
B: The print was partly lustrous and uneven in color strength;
C: The print was entirely lustrous and uneven in color strength.

(5) Evaluation of water fastness:

Solid printing was conducted on SK paper (Canon NP Dry SK) by the printer. After the resulting print was left over for at least 1 hour, it was vertically immersed for 3 seconds in still water and then vertically pulled up to air-dry it in the interior of a room. Thereafter, the degree of redyeing due to running of dye to a blank was observed to rank the water fastness in accordance with the following standard:

A: Neither redyeing nor smearing occurred on a blank;
B: Redyeing occurred, and smearing was somewhat recognized on a blank;
C: Redyeing occurred to a significant extent, and smearing was marked on a blank.

(6) Evaluation of resistance to feathering:

English characters and numerals were printed on SK paper by the printer, and the resulting print was left over for at least 1 hour. The print was then observed by a microscope and naked eyes to evaluate each ink in the resistance to feathering by ranking the degrees of sharpness of the letters and whisker-like feathering occurred on the letters in accordance with the following standard:

A: The letters were sharp, and no whisker-like feathering occurred;
B: The letters were dull, and whisker-like feathering slightly occurred;
C: The letters were dull, and whisker-like feathering occurred to a great extent.

(7) Drying time:

English characters and numerals were printed on SK paper by the printer. After 15 seconds, 20 seconds, 25 seconds and 30 seconds, the printed area was rubbed with paper for lens-cleaning to measure the number of seconds required until the printed surface was no longer smeared, thereby ranking the fixing ability in accordance with the following standard:

A: Not longer than 15 seconds;
B: 16 to 25 seconds;
C: Not shorter than 26.

TABLE 3

| | Example | | | | | |
|---|---|---|---|---|---|---|
| | 22 | 23 | 24 | 25 | 26 | 27 |
| Compound represented by Structural formula (a) (Y = SO$_3$R) | 2.7 | 2.5 | | | | 2.6 |
| Compound represented by Structural formula (a) (Y = H) | | | 2.7 | 2.5 | 2 | |
| C.I. Direct Yellow 86 | 0.3 | | 0.3 | | 0.15 | 0.3 |
| C.I. Direct Yellow 142 | | 0.2 | | 0.2 | | |
| Ethylene glycol | 10 | | 6 | | | |
| Diethylene glycol | | 10 | | 10 | | |
| Thiodiglycol | | 5 | | | | 5 |
| Glycerol | | 8 | 6 | | 10 | 7 |
| Urea | 7 | 5 | 7 | 5 | 5 | 6 |
| Ammonium sulfate | 0.6 | 0.6 | 0.5 | 0.7 | 0.1 | 1.0 |
| Sodium hydroxide | 0.6 | 0.4 | 0.5 | 0.4 | 0.15 | 1.0 |
| Ethanol | 5 | | | 5 | 5 | 5 |
| Isopropanol | | 4 | 4 | | | |

TABLE 3-continued

| | Example | | | | | |
|---|---|---|---|---|---|---|
| | 22 | 23 | 24 | 25 | 26 | 27 |
| Water | 73.8 | 64.3 | 73.0 | 76.2 | 77.6 | 72.1 |

TABLE 4

| | Referential Example | | | | | |
|---|---|---|---|---|---|---|
| | 1 | 2 | 3 | 4 | 5 | 6 |
| Compound represented by Structural formula (a) (Y = H) | | 3 | 2.7 | | | |
| Compound represented by Structural formula (a) (Y = SO$_3$H) | 2 | | | 2.7 | 2.5 | 2 |
| C.I. Direct Yellow 86 | | | | | | 0.15 |
| C.I. Direct Yellow 142 | | | | | 0.2 | |
| Ethylene glycol | | 10 | | | | |
| Diethylene glycol | | | 15 | 10 | 10 | |
| Thiodiglycol | | | 5 | | | |
| Glycerol | 10 | | 8 | | | |
| 2-Pyrrolidone | | | | | | 5 |
| Ethylene glycol monomethyl ether | | | | | | 5 |
| Urea | 5 | 7 | | 5 | | 5 |
| Ammonium sulfate | 0.1 | | 0.6 | | | 0.5 |
| Sodium hydroxide | 0.15 | 0.6 | 0.4 | | | 0.3 |
| Ethanol | 5 | 5 | | | 5 | 5 |
| Isopropanol | | | 4 | | | |
| Water | 77.75 | 74.4 | 64.3 | 82.3 | 82.3 | 77.05 |

TABLE 5

| Evaluation item | Example | | | | | |
|---|---|---|---|---|---|---|
| | 22 | 23 | 24 | 25 | 26 | 27 |
| Color tone | Black | Black | Black | Black | Black | Black |
| Clogging tendency | A | A | A | A | A | A |
| Density of print | A | A | A | A | A | A |
| Bronzing tendency | A | A | A | A | A | A |
| Water fastness | A | A | A | A | A | A |
| Resistance to feathering | A | A | A | A | A | A |
| Fixing ability | A | A | A | A | A | A |

TABLE 6

| Evaluation item | Referential Example | | | | | |
|---|---|---|---|---|---|---|
| | 1 | 2 | 3 | 4 | 5 | 6 |
| Color tone | RP | RP | RP | RP | Black | Black |
| Clogging tendency | B | A | A | C | C | B |
| Density of print | A | A | A | A | C | A |
| Bronzing tendency | A | A | A | C | C | A |
| Water fastness | A | C | A | A | A | A |
| Resistance to feathering | A | A | B | A | A | B |
| Fixing ability | A | A | B | B | A | A |

Note: RP = Royal purplish.

As described above, the inks according to the third aspect of the present invention are excellent in water fastness when conducting printing on all recording materials, in particular, so-called plain paper such as paper for copying, commonly used in offices and homes, and have an ideal black color. In addition, the inks can provide high-quality prints high in density and free of feathering, are excellent in solution stability, causes no clogging, and are good in storage stability and suitable for use as ink-jet inks.

[Fourth Aspect]

EXAMPLE 28 to 32

After their corresponding components as described below were mixed and stirred for 5 hours, the resulting mixtures were separately filtered under pressure through a membrane filter (Fluoropore Filter, trade name: product of Sumitomo Electric Industries, Ltd.) having a pore size of 0.22 μm, thereby preparing respective inks A to E according to Examples 28 to 32 of the present invention.

Each of the inks A to E thus obtained was then charged into an ink cartridge (BC-01) for an ink-jet printer, BJ-10 v (trade name, manufactured by Canon Corp.) making use of a heating element as an ejection-energy source to conduct recording on commercially-available paper for copying and bond paper by this printer, thereby evaluating the ink in amount of the ink ejected from a nozzle, density of the resulting recorded sample, percent occurrence of feathering, clogging tendency upon resumption of printing after suspension and frequency response characteristics. The results are given in Table 7.

| Ink A: | |
|---|---|
| Pro-jet Fast Black 2 Liquid (product of ICI, Ltd.) | 2 parts |
| Ethylene glycol | 15 parts |
| Lithium phosphate | 0.5 part |
| Water | 82.5 parts |

| Ink B: | |
|---|---|
| Pro-jet Fast Black 2 Liquid (product of ICI, Ltd.) | 2 parts |
| Ethylene glycol | 15 parts |
| Sodium phosphate | 0.5 part |
| Water | 82.5 parts |

| Ink C: | |
|---|---|
| Pro-jet Fast Black 2 Liquid (product of ICI, Ltd.) | 2 parts |
| Ethylene glycol | 15 parts |
| Potassium phosphate | 0.5 part |
| Water | 82.5 parts |

| Ink D: | |
|---|---|
| Pro-jet Fast Black 2 Liquid (product of ICI, Ltd.) | 2 parts |
| Ethylene glycol | 15 parts |
| Rubidium phosphate | 0.5 part |
| Water | 82.5 parts |

| Ink E: | |
|---|---|
| Pro-jet Fast Black 2 Liquid (product of ICI, Ltd.) | 2 parts |
| Ethylene glycol | 15 parts |
| Cesium phosphate | 0.5 part |
| Water | 82.5 parts |

Referential Example 7

An ink F according to Referential Example 7 was prepared in the same manner as in Examples 28 to 32 except that the alkali metal compound was not used. The results of its evaluation are shown in Table 7.

EXAMPLES 33 and 34

After their corresponding components as described below were mixed and stirred for 5 hours, the resulting mixtures were separately filtered under pressure through a membrane filter (Fluoropore Filter, trade name: product of Sumitomo Electric Industries, Ltd.) having a pore size of 0.22 μm, thereby preparing respective inks G to H according to Examples 33 and 34 of the present invention. The same tests as in Examples 28 to 32 were then conducted on the inks. The results are shown in Table 8.

| Ink G: | |
|---|---|
| Pro-jet Fast Black 2 Liquid (product of ICI, Ltd.) | 2.2 parts |
| Ethylene glycol | 5 parts |
| Glycerol | 5 parts |
| Urea | 5 parts |
| Lithium phosphate | 0.6 part |
| Water | 82.2 parts |

The lithium ion concentration in Ink G was 0.16 mol/l, and the dye concentration was 0.035 mol/l, and so the lithium ion was contained in a proportion of 4.6 mol/mol of dye.

| Ink H: | |
|---|---|
| Pro-jet Fast Black 2 Liquid (product of ICI, Ltd.) | 2.2 parts |
| Ethylene glycol | 5 parts |
| Glycerol | 5 parts |
| Urea | 5 parts |
| Sodium phosphate | 0.6 part |
| Water | 82.2 parts |

The sodium ion concentration in Ink H was 0.11 mol/l, and the dye concentration was 0.035 mol/l, and so the sodium ion was contained in a proportion of 3.1 mol/mol of dye.

Referential Example 8

An ink I according to Referential Example 8 was prepared in the same manner as in Examples 33 and 34. The results of its evaluation are shown in Table 8.

| Ink I: | |
|---|---|
| Pro-jet Fast Black 2 Liquid (product of ICI, Ltd.) | 2.2 parts |
| Ethylene glycol | 5 parts |
| Glycerol | 5 parts |
| Urea | 5 parts |
| Sodium phosphate | 0.1 part |
| Water | 82.7 parts |

The sodium ion concentration in Ink H was 0.018 mol/l, and the dye concentration was 0.035 mol/l, and so the sodium ion was contained in a proportion of 0.51 mol/mol of dye.

<Methods and Standards for Evaluation>

(1) Amount of ink ejected:

Printing was conducted on several sheets of paper for copying (Canon NP-DRY) by the ink-jet recording apparatus as described above, thereby estimating the amount of ink ejected from one nozzle by weight change of the ink cartridge (BC-01).

(2) Evaluation of density of print:

Printing was conducted on paper for copying (Canon NP-DRY) by the ink-jet recording apparatus to measure the density of the resulting print by a Macbeth densitometer (TR918).

(3) Evaluation of percent occurrence of feathering:

Three hundred dots were continuously printed (under environmental conditions of 25° C. and 60% RH) on commercially-available paper for copying and bond paper so as not to overlap to one another. After the thus-obtained print was left over for at least 1 hour, the number of dots on which feathering occurred was counted through a microscope to calculate the percentage of such dots to the total dots, thereby ranking it in accordance with the following standard:

A: Not higher than 10%;

B: 11 to 30%;
C: Not lower than 31%.

(4) Evaluation of clogging tendency:

In the fourth aspect, the clogging tendency means a clogging tendency at the time printing was resumed after suspending the printing. After an ink to be tested was charged in the printer to continuously print English characters and numerals for 10 hours, the printer was stopped and left over for 10 minutes without capping the head. Thereafter, English characters and numerals were printed again to determine whether defective printed areas such as blurred and/or defected characters were observed, thereby ranking the anti-clogging property of the ink in accordance with the following standard: (printed under environmental conditions of 25° C. and 60% RH)

A: No defective printed areas were observed from the first character;
B: The first character was partly blurred or defected;
C: No printing could be conducted from the first character.

(5) Evaluation of frequency response characteristic:

The resulting print was observed by naked eyes with respect to its printing conditions, namely, conditions of blurred characters and blank areas, and defective ink-droplet impact such as splash and slippage to evaluate the ink in the frequency response characteristic by ranking the conditions in accordance with the following standard:

AA: The follow-up condition of the ink to the frequency was good, and none of blurred characters, blank areas and defective ink-droplet impact were observed upon both printing of characters and solid printing;
A: The follow-up condition of the ink to the frequency was substantially good, and none of blurred characters, blank areas and defective ink-droplet impact were observed upon printing of characters, but blur was slightly recognized upon solid printing;
B: None of blurred characters and blank areas were observed, but defective ink-droplet impact was partly recognized upon printing of characters, and upon solid printing, blur and blank areas were observed at portions of about one-third of the whole solid printed area;
C: Blur and blank areas were observed to a great extent upon solid printing, and blurred characters and defective ink-droplet impact were also recognized to a large extent upon printing of characters.

TABLE 7

|  | Example | | | | | Ref. Ex. |
| --- | --- | --- | --- | --- | --- | --- |
|  | 28 | 29 | 30 | 31 | 32 | 7 |
| Ink | A | B | C | D | E | F |
| Amount of ink ejected (pl) | 98.5 | 88.0 | 75.5 | 65.0 | 63.5 | 55.0 |
| Density of print | 1.45 | 1.40 | 1.30 | 1.25 | 1.23 | 1.20 |
| Percent (*1) | A | A | B | B | B | C |
| occurrence of (*2) feathering | A | A | B | B | B | C |
| Clogging tendency | A | A | B | B | B | C |
| Frequency response characteristics | AA | A | B | B | B | C |

(*1): Paper for copying.
(*2): Bond paper.

TABLE 8

|  | Example | | Ref. Ex. |
| --- | --- | --- | --- |
|  | 33 | 34 | 8 |
| Ink | G | H | I |
| Amoung of ink ejected (pl) | 99.0 | 92.5 | 70.0 |
| Density of print | 1.46 | 1.42 | 1.25 |
| Percent (*1) | A | A | B |
| occurrence of (*2) feathering | A | A | B |
| Clogging tendency | A | A | C |
| Frequency response characteristics | AA | A | C |

(*1): Paper for copying.
(*2): Bond paper.

As described above, when the inks according to the fourth aspect of the present invention are used, recording free of feathering, excellent in quality and good in fixing ability can be conducted on plain paper such as paper for copying, paper for reporting, notepaper, letter paper, bond paper and continuous business forms, which are commonly used in offices and the like.

According to the fourth aspect of the present invention, there can also be provided inks high in safety upon use in offices and homes.

In addition, the inks according to the fourth aspect have effects of solving various problems without lowering other properties such as ejection stability, anti-clogging property at the tip of a nozzle and quality of print.

[Fifth Aspect]

EXAMPLE 35

The following components were mixed to prepare an ink that is not corrosive to metal according to the present invention.

| Pro-jet Fast Black 2 Liquid (product of ICI, Ltd.) | 3 parts |
| --- | --- |
| Ethylene glycol | 10 parts |
| Ammonium sulfate | 1 part |
| Sodium hydroxide | 1 part |
| Water | 85 parts |

The pH of this ink was measured and found to be 10.5.

Figure 7:
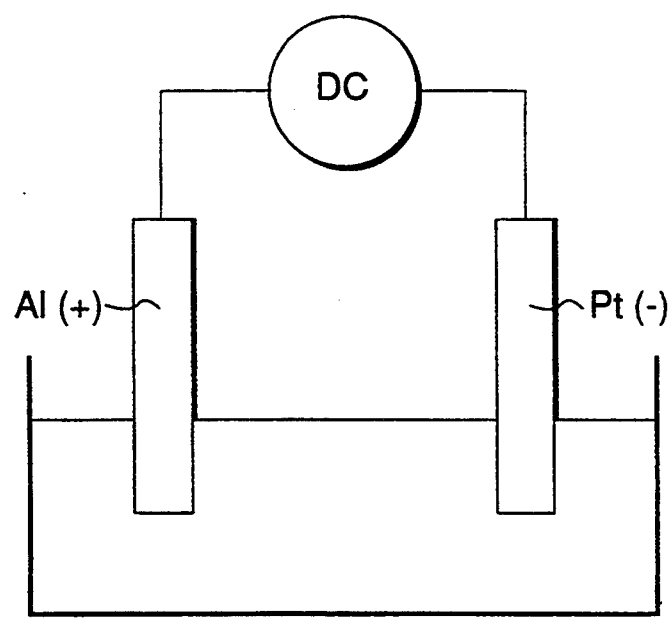
FIG. 7 is a schematic illustration of a withstand voltage meter used in the embodiments of the present invention.

The withstand voltage of a protective film formed on the surface of an aluminum plate using the ink was then measured in a testing form as shown in FIG. 7.

Using a variable voltammeter, the aluminum plate and a platinum plate were first connected to a positive electrode and a negative electrode, respectively. Incidentally, since the ink-jet head illustrated in FIG. 1 is designed to be positive in an energized state, the aluminum plate was made positive in the testing method illustrated in FIG. 7.

Even when voltage applied was continuously varied (increased) using the voltammeter to apply about 100 V of voltage, no electric current was detected.

Comparative Example 22

For the sake of comparison, an ink having the same composition as that of the ink of Example 35 except for omission of ammonium sulfate and sodium hydroxide was prepared. However, its pH was adjusted with an aqueous ammonium solution so as to keep the same pH as that of the ink of Example 35.

Using this ink, the same test as described above was conducted. As a result, it was observed that an electric current flows even when applying a low voltage (10 V or lower). Further, it was visually recognized that aluminum is dissolved in the ink to generate a gas.

EXAMPLE 36

The following components were mixed to prepare a metal-noncorrosive ink according to Example 33 of the present invention.

| | |
|---|---|
| Pro-jet Fast Black 2 Liquid (product of ICI, Ltd.) | 3 parts |
| Diethylene glycol | 10 parts |
| Sodium hydroxide | 0.1 part |
| Ammonium sulfate | 0.1 part |
| Water | 86.8 parts |

The pH of this ink was measured and found to be 8.5.

The withstand voltage of a protective film formed on the surface of an aluminum plate was then measured in exactly the same manner as in Example 35 except that this metal-noncorrosive ink was used.

Even when voltage applied was continuously varied (increased) using the voltammeter to apply about 100 V of voltage, no electric current was detected.

Comparative Example 23

An ink having the same composition as that of the ink of Example 36 except for omission of ammonium sulfate and sodium hydroxide was prepared. However, its pH was adjusted with an aqueous ammonium solution so as to keep the same pH as that of the ink of Example 36.

Using this ink, the same test as in Example 35 was conducted. As a result, it was observed that an electric current flows even when applying a low voltage (10 V or lower). Further, it was visually recognized that aluminum is dissolved in the ink to generate a gas.

EXAMPLE 37

The ink that is not corrosive to metal obtained in Example 35 was charged into an ink cartridge (BC-01) for an ink-jet printer, BJ-10 v (trade name, manufactured by Canon Corp., drive frequency: 3 kHz, drive voltage: 23 V) making use of thermal energy as an ejection-energy source for ink to conduct recording on SK paper (paper for electrophotography, product of Canon Corp.) by this printer. At this time, a head the heating resistor of which has a protective layer substantially free of defects such as pinholes was used as a head for the BC-01 ink cartridge.

As a result, the printer head could continue to normally print even in a print durability test of $4 \times 10 E7$ pulses or more. Further, the ink was evaluated in quantity of ink ejected from a nozzle, and print density and water fastness of the resulting recorded sample. The results are shown in Table 9.

Comparative Example 24

The following components were mixed, and the mixture was adjusted with a pH adjustor to keep pH 8.5 similar to the ink of Example 36, thereby preparing an ink having the following composition.
Composition

| | |
|---|---|
| Pro-jet Fast Black 2 Liquid (product of ICI, Ltd.) | 3 parts |
| Ethylene glycol | 10 parts |
| Sodium sulfate | 1.2 part |
| Sodium hydroxide | 0.6 part |
| Water | 85.2 parts |

Similar to Example 37, this ink was charged into a BC-01 ink cartridge to conduct a print durability test. As a result, tantalum of the protective film was dissolved in the ink in printing of $1 \times 10 E7$ pulses or more, so that a part of a heater was electrically disconnected, resulting in printing failure.

Comparative Example 25

The following components were mixed, and the mixture was adjusted with a pH adjustor to keep pH 8.5 similar to the ink of Example 36, thereby preparing an ink having the following composition.
Composition

| | |
|---|---|
| Pro-jet Fast Black 2 Liquid (product of ICI, Ltd.) | 3 parts |
| Diethylene glycol | 10 parts |
| Sodium hydroxide | 0.05 part |
| Ammonium sulfate | 0.3 part |
| Water | 86.65 parts |

Similar to Example 37, the thus-obtained ink was charged into a BC-01 ink cartridge to conduct recording on SK paper by the printer, thereby evaluating the ink in quantity of ink ejected from a nozzle, and print density and water fastness of the resulting recorded sample. The results are shown in Table 9. The ink was poor in density of the print.

Comparative Example 26

The following components were mixed, and the mixture was adjusted with a pH adjustor to keep pH 8.5 similar to the ink of Example 36, thereby preparing an ink having the following composition.
Composition

| | |
|---|---|
| Pro-jet Fast Black 2 Liquid (product of ICI, Ltd.) | 3 parts |
| Diethylene glycol | 10 parts |
| Sodium hydroxide | 0.4 part |
| Ammonium sulfate | 0.05 part |
| Water | 86.65 parts |

Similar to Example 37, the thus-obtained ink was charged into a BC-01 ink cartridge to conduct recording on SK paper by the printer, thereby evaluating the ink in quantity of ink ejected from a nozzle, and print density and water fastness of the resulting recorded sample. The results are shown in Table 9. The ink was poor in water fastness of the print.

TABLE 9

| | | Comparative Example | |
|---|---|---|---|
| Evaluation item | Example 37 | 25 | 26 |
| Amount of ink ejected[*1] | 90 | 50 | 80 |
| Print density[*2] | 1.35 | 1.15 | 1.3 |
| Water fastness[*3] | A | A | C |

Methods of the evaluation shown in Table 9 will hereinafter be described in detail.
[*1] Amount of ink ejected:

An ink to be tested was charged into a BC-01 ink cartridge for an ink-jet printer, BJ-10v (manufactured by Canon Corp., drive frequency: 3 kHz, drive voltage: 23 V) making use of thermal energy to conduct printing on several sheets of paper for copying (Canon NP-DRY) by the ink-jet printer, thereby estimating the quantity of ink ejected from one nozzle by weight change of the ink cartridge (BC-01).

*2 Evaluation of density of print:

Printing was conducted on paper for copying (Canon NP-DRY) by the same ink-jet recording apparatus as described above to measure the density of the resulting print by a Macbeth densitometer (TR918).

*3 Evaluation of water fastness:

Printing was conducted on paper for copying (Canon NP-DRY) by the same ink-jet recording apparatus as described above. After 1 hour, the resulting print was immersed for 3 seconds in a water tank to evaluate the water fastness by determining the degree of running of the ink on the print, thereby ranking the degree in accordance with the following standard:

A: Ink was scarcely run by water;
B: Ink was slight run, but characters printed were legible;
C: Ink was almost run, and characters printed were illegible.

According to the fifth aspect of the present invention, as described above, there can be provided liquid compositions that are not corrosive to metal, by which the corrosion of a metal caused by a liquid kept in contact with the metal in an apparatus of a structure that its metal surface is brought into contact with the liquid upon its use, or the like can be decreased to the utmost, and particularly, the disconnection or dissolution of the metal due to corrosion which is caused where the metal is an electrode material or the like and electrically acts on can be effectively prevented.

According to the fifth aspect of the present invention, there are inks that are not corrosive to metal. As a result, there is provided an ink-jet recording method excellent in reliability, by which the service life of a head in an ink-jet recording apparatus making use of thermal energy as an ink-ejecting source can be markedly elongated, and the failure rate of the apparatus can be reduced to a significant extent.

What is claimed is:

1. An ink comprising a coloring material and a liquid medium dissolving the coloring material therein, wherein the ink comprises a dye having at least one ammonium ion as a counter ion, an organic amine in an amount of from 0.01 to 10% by weight based on the total weight of the ink and a nitrogen-containing compound selected from the group consisting of urea, thiourea, ethylene urea, alkyl urea, alkyl thiourea, dialkyl urea and dialkyl thiourea.

2. The ink according to claim 1, further comprising a surfactant.

3. The ink according to claim 1, further comprising at least one compound of hydroxides and alkali metal salts.

4. The ink according to claim 1, further comprising a sulfate.

5. The ink according to claim 1, wherein the dye has at least one carboxyl group.

6. The ink according to claim 1, wherein the dye has a divalent organic bonding group.

7. The ink according to claim 1, wherein the dye is at least one of dyes in which at least one —COOH or —COSH of each of compounds represented by the following structural formulae (b) to (e) forms a salt with an ammonium ion:

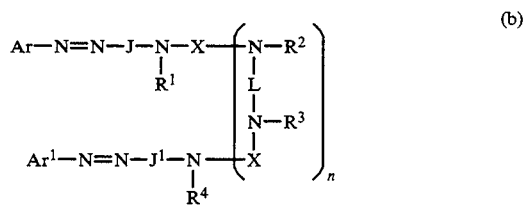

wherein Ar and Ar$^1$ are independently an aryl group or a substituted aryl group, at least one of which has at least one substituent group selected from the group consisting of —COOH and —COSH, J and J$^1$ are independently a group represented by the formula

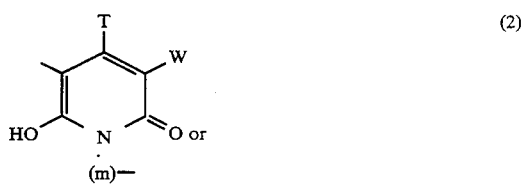

in which R$^5$ is an atom or group selected from the group consisting of a hydrogen atom, alkyl groups, substituted alkyl groups, alkoxy groups, halogen atoms, a cyano group, a ureido group, and NHCOR$^6$ (R$^6$ being a hydrogen atom, an alkyl group, a substituted alkyl group, an aryl group, a substituted aryl group, an aralkyl group or a substituted aralkyl group), T is an alkyl group, W is an atom or group selected from the group consisting of a hydrogen atom, a cyano group, —CONR$^{10}$R$^{11}$ pyridinium and —COOH, m is an alkylene chain having 2 to 8 carbon atoms, B is a hydrogen atom, an alkyl group or —COOH R$^1$, R$^2$, R$^3$, R$^4$, R$^{10}$ and R$^{11}$ are independently a hydrogen atom, an alkyl group or a substituted alkyl group, L is a divalent organic bonding group, n is 0 or 1, X is a carbonyl group or a group represented by the formula

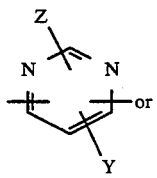

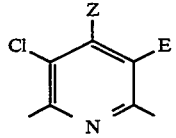

in which Z is $OR^7$, $SR^7$, or $NR^8R^9$, Y is a hydrogen atom, a chlorine atom or a cyano group, E is a chlorine atom or a cyano group, and $R^7$, $R^8$ and $R^9$ are independently a hydrogen atom, an alkenyl group, a substituted alkenyl group, an alkyl group, a substituted alkyl group, an aryl group, a substituted aryl group, an aralkyl group or a substituted aralkyl group, or $R^8$ and $R^9$ form a 5- or 6-membered ring together with the N atom to which they are bonded, with the proviso that the dye (b) has at least two groups selected from —COOH and —COSH where no $SO_3H$ is contained therein, or has the same number of groups selected from —COOH and —COSH as the number of $SO_3H$ groups where the dye (b) has one or more $SO_3H$ groups;

$$Ar^2-N=N-J^2-X^1-(NR^{12}-L^1-NR^{13}-X^1)_n-J^2-N=N-Ar^3 \quad (c)$$

wherein $J^2$ is a group of the formula

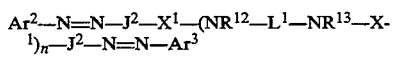

$Ar^2$ and $Ar^3$ are independently an aryl group or a substituted aryl group, at least one of which has at least one substituent group selected from the group consisting of —COOH and —COSH, $R^{12}$ and $R^{13}$ are independently a hydrogen atom, an alkyl group, a substituted alkyl group, an alkenyl group or a substituted alkenyl group, $L^1$ is a divalent organic bonding group, n is 0 or 1, $X^1$ is a carbonyl group or a group represented by the formula

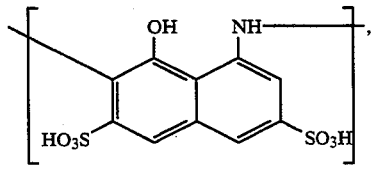

or

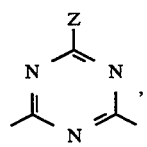

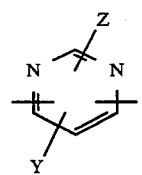

in which Z is $NR^{14}R^{15}$, $SR^{16}$, or $OR^{16}$, Y is a hydrogen atom, a chlorine atom, Z, $SR^{17}$ or $OR^{17}$, E is a chlorine atom or a cyano group, and $R^{14}$, $R^{15}$, $R^{16}$ and $R^{17}$ are independently a hydrogen atom, an alkyl group, a substituted alkyl group, an alkenyl group, a substituted alkenyl group, an aryl group, a substituted aryl group, an aralkyl group or a substituted aralkyl group, or $R^{14}$ and $R^{15}$ form a 5- or 6-membered ring together with the N atom to which they are bonded, with the proviso that the dye (c) has the same number of groups selected from the group consisting of —COOH and —COSH as the number of $SO_3H$ groups;

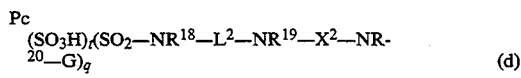

wherein Pc is a phthalocyanine ring containing a metal, $R^{18}$, $R^{19}$ and $R^{20}$ are independently a hydrogen atom, an alkyl group, a substituted alkyl group, an alkenyl group, a substituted alkenyl group, an aralkyl group or a substituted aralkyl group, $L^2$ is a divalent organic bonding group, $X^2$ is a carbonyl group or a group represented by the formula

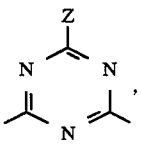

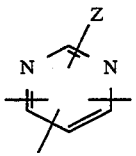

or

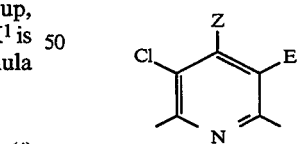

in which Z is $NR^{21}R^{22}$, $SR^{23}$ or $OR^{23}$, Y is a hydrogen atom, a chlorine atom, Z, $SR^{24}$ or $OR^{24}$, E is a chlorine atom or a cyano group, and $R^{21}$, $R^{22}$, $R^{23}$ and $R^{24}$ are independently a hydrogen atom, an alkyl group, a substituted alkyl group, an aryl group, a substituted aryl group, an aralkyl group or a substituted aralkyl group, or $R^{21}$ and $R^{22}$ form a 5- or 6-membered ring together with the N atom to which they are bonded, G is a colorless organic group substituted by one or two groups selected from the group consisting of —COSH and —COOH, and (t+q) is 3 or 4, with the proviso that the dye (d) has at least one $SO_3H$ group and the same number of groups selected from the group consisting of —COSH and —COOH as the number of SO₃H groups; and

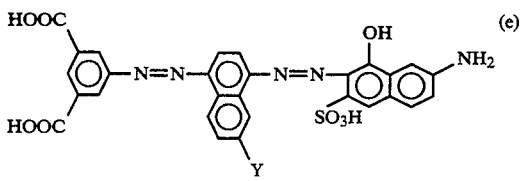

(e)

wherein Y is a hydrogen atom or SO₃H.

8. The ink according to claim 7, which comprises in combination at least one of the dyes represented by the structural formula (e) and at least one dye selected from yellow dyes and blue dyes.

9. The ink according to claim 8, wherein the yellow dye is at least one selected from the group consisting of compounds represented by the structural formula (b), C.I. Acid Yellow 17:1, C.I. Acid Yellow 23, C.I. Acid Yellow 49, C.I. Acid Yellow 65, C.I. Acid Yellow 104, C.I. Acid Yellow 183, C.I. Acid yellow 155, C.I. Acid Yellow 194, C.I. Direct Yellow 86, C.I. Direct Yellow 106, C.I. Direct Yellow 142 and C.I. Direct Yellow 194.

10. The ink according to claim 8, wherein the blue dye is at least one selected from the group consisting of compounds represented by the structural formula (d), C.I. Acid Blue 9, C.I. Acid Blue 13, C.I. Acid Blue 68, C.I. Acid Blue 69, C.I. Acid Blue 138, C.I. Acid Blue 185, C.I. Acid Blue 249, C.I. Acid Blue 258, C.I. Direct Blue 83, C.I. Direct Blue 86, C.I. Direct Blue 87, C.I. Direct Blue 95, C.I. Direct Blue 143, C.I. Direct Blue 166, C.I. Direct Blue 176 and C.I. Direct Blue 199.

11. The ink according to claim 8, wherein a mixing ratio of the dye represented by the structural formula (e) to the yellow dye is within a range of from 40:1 to 4:1 by weight.

12. The ink according to claim 10, wherein a mixing ratio of the dye represented by the structural formula (e) to the blue dye is within a range of from 40:1 to 4:1 by weight.

13. The ink according to claim 1, wherein the organic amine is selected from the group consisting of monoethanol amine, diethanol amine, triethanolamine, monoisopropanolamine, diisopropanolamine and triisopropanolamine.

14. The ink according to claim 1, wherein the content of the organic amine is within a range of from 0.01 to 5.0% by weight based on the total weight of the ink.

15. The ink according to claim 2, wherein the surfactant is an ionic surfactant, a nonionic surfactant, an amphoteric surfactant or a mixture of two or more surfactants thereof.

16. The ink according to claim 2, wherein the surfactant is a nonionic surfactant.

17. The ink according to claim 2, wherein the surfactant is at least one selected from the group consisting of ethylene oxide adducts of higher alcohols, ethylene oxide adducts of alkylphenols, ethylene oxide-propylene oxide copolymers and ethylene Oxide adducts of acetylene glycol.

18. The ink according to claim 2, wherein the content of the surfactant is within a range of from 0.01 to 10% by weight based on the total weight of the ink.

19. The ink according to claim 1, wherein the content of the nitrogen-containing compound is within a range of from 0.01 to 20% by weight based on the total weight of the ink.

20. The ink according to claim 3, wherein the hydroxide is selected from the group consisting of sodium hydroxide, lithium hydroxide, potassium hydroxide and ammonium hydroxide.

21. The ink according to claim 3, wherein the content of the hydroxide is within a range of from 0.01 to 5.0% by weight based on the total weight of the ink.

22. The ink according to claim 3, wherein the alkali metal salt is selected from the group consisting of sodium acetate, lithium acetate, potassium acetate, sodium nitrate, lithium nitrate, potassium nitrate, sodium phosphate, lithium phosphate, potassium phosphate, sodium carbonate, lithium carbonate and potassium carbonate, 23. The ink according to claim 3, wherein the content of the alkali metal salt is within a range of from 0.01 to 5.0% by weight based on the total weight of the ink.

24. The ink according to claim 4, wherein the sulfate is selected from the group consisting of sodium sulfate, lithium sulfate, potassium sulfate and ammonium sulfate.

25. The ink according to claim 4, wherein the content of the sulfate is within a range of from 0.01 to 5.0% by weight based on the total weight of the ink.

26. An ink-jet recording method comprising ejecting droplets of an ink out of an orifice in accordance with a recording signal to make a record on a recording material, wherein said ink is the ink as set forth in claim 1.

27. The ink-jet recording method according to claim 26, wherein the ink droplets are ejected by applying thermal energy to the ink.

28. A recording unit comprising an ink container portion with an ink held therein and a head from which the ink is ejected in the form of ink droplets, wherein said ink is the ink as set forth in claim 1.

29. The recording unit according to claim 28, wherein the head is a head which causes thermal energy to act on the ink to eject its droplets.

30. The recoding unit according to claim 28, wherein the ink container portion is formed of polyurethane, cellulose or polyvinyl acetate.

31. An ink cartridge comprising an ink container portion with an ink held therein, wherein said ink is the ink as set forth in claim 1.

32. The ink cartridge according to claim 31, wherein the ink container portion is made of a polyolefin at its surface with which the ink comes into contact.

33. An ink-jet recording apparatus comprising a recording unit having an ink container portion with an ink held therein and a head from which the ink is ejected in the form of ink droplets, wherein said ink is the ink as set forth in claim 1.

34. The ink-jet recording apparatus according to claim 33, wherein the head is a head which causes thermal energy to act on the ink to eject its droplets.

35. The ink-jet recording apparatus according to claim 33, wherein the ink container portion is formed of polyurethane, cellulose or polyvinyl acetate.

36. An ink-jet recording apparatus comprising a recording head from which an ink is ejected in the form of ink droplets, an ink cartridge having an ink container portion with the ink held therein, and an ink feeder for feeding the ink from the ink cartridge to the recording head, wherein said ink is the ink as set forth in claim 1.

37. The ink-jet recording apparatus according to claim 36, wherein the recording head is a head which causes thermal energy to act on the ink to eject its droplets.

38. The ink-jet recording apparatus according to claim 36, wherein the ink container portion is made of a polyolefin at its surface with which the ink comes into contact.

39. An ink comprising a coloring material and a liquid medium dissolving the coloring material therein, wherein the coloring material comprises at least one of dyes represented by the structural formula

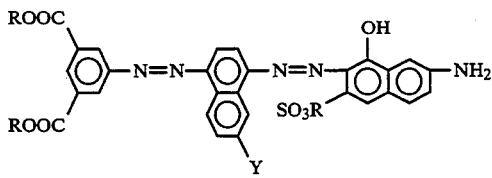

(a)

wherein R is NH₄ an Y is H or SO₃R, and at least one yellow dye selected from the group consisting of C.I. Acid Yellow 17:1, C.I. Acid Yellow 23, C.I. Acid Yellow 49, C.I. Acid Yellow 65, C.I. Acid Yellow 104, C.I. Acid Yellow 183, C.I. Acid Yellow 155, C.I. Acid Yellow 194, C.I. Direct Yellow 86, C.I. Direct Yellow 106, C.I. Direct Yellow 142 and C.I. Direct Yellow 194, and the liquid medium comprises at least one polyhydric alcohol and an aliphatic monohydric alcohol and contains urea, and ammonium salt of an inorganic acid and a hydroxide, wherein the ammonium salt of an inorganic acid and the hydroxide each is contained in the ink in an amount of from 0.1 to 1.0% by weight based on the total weight of the ink.

40. The ink according to claim 39, wherein a mixing ratio of the dye represented by the structural formula (a) to the yellow dye is within a range of from 40:1 to 4:1 by weight.

41. The ink according to claim 39, wherein the polyhydric alcohol comprises at least one selected from the group consisting of ethylene glycol, diethylene glycol, thiodiglycol and glycerol.

42. An ink that is not corrosive to metal comprising a dye having at least one —COOM (M being an alkali metal atom or an ammonium ion) in its molecule and a liquid medium dissolving or dispersing the dye therein, wherein the ink comprises a sulfate and a hydroxide, and its pH is adjusted within a range of from 7 to 10.5, wherein the content of the sulfate and the hydroxide in the ink is each at least 0.1% by weight based on the total weight of the ink.

43. The ink according to claim 42, wherein the liquid medium comprises 70 to 95% by weight of water and at most 25% by weight of a water-soluble organic solvent.

44. An ink-jet recording method comprising causing thermal energy from a heating element to act on an ink to eject droplets of the ink from an orifice, thereby conducting recording, wherein the ink as set forth in claim 42 is used.

* * * * *

UNITED STATES PATENT AND TRADEMARK OFFICE
CERTIFICATE OF CORRECTION

PATENT NO. : 5,451,251
DATED : September 19, 1995
INVENTOR(S) : KUMIKO MAFUNE, et al.

It is certified that error appears in the above-indentified patent and that said Letters Patent is hereby corrected as shown below:

ON THE COVER PAGE

Item: [56] References Cited

FOREIGN PATENT DOCUMENTS

"2255876 10/1990 Japan
2296878 12/1990 Japan" should read
--2-255876 10/1990 Japan
2-296878 12/1990 Japan--.

COLUMN 2

Line 67, "5,062893" should read --5,062,893--.

COLUMN 5

Line 58, "yellow 155," should read --Yellow 155,--.

COLUMN 8

Line 2, "by-using" should read --by using--.

COLUMN 16

Line 65, "an" should read --a--.

COLUMN 18

Line 66, "are preferred" should read --preferred are--.

UNITED STATES PATENT AND TRADEMARK OFFICE
CERTIFICATE OF CORRECTION

PATENT NO. : 5,451,251        Page 2 of 4
DATED : September 19, 1995
INVENTOR(S) : KUMIKO MAFUNE, et al.

It is certified that error appears in the above-indentified patent and that said Letters Patent is hereby corrected as shown below:

COLUMN 40

Line 54, "yellow 155," should read --Yellow 155,--.

COLUMN 44

Line 56, "a ink-jet" should read --an ink-jet--.

COLUMN 47

Line 28, "an" should read --a--.

COLUMN 49

Line 8, "an" should read --a--.

COLUMN 50

Line 5, "to-a" should read --to a--"

COLUMN 58

Line 28, "Referential" should read --¶Referential--.

COLUMN 64

Line 6 (Table 8), "Amoung" should read --Amount--.

UNITED STATES PATENT AND TRADEMARK OFFICE
CERTIFICATE OF CORRECTION

PATENT NO. : 5,451,251

DATED : September 19, 1995

INVENTOR(S) : KUMIKO MAFUNE, et al.

It is certified that error appears in the above-indentified patent and that said Letters Patent is hereby corrected as shown below:

COLUMN 68

Line 51, "-$CONR^{10}R^{11}$pyridin-" should read -- -$CONR^{10}R^{11}$, pyridin- --.

COLUMN 71

Line 22, "yellow 155," should read --Yellow 155,--.

COLUMN 71

Line 60, "Oxide" should read --oxide--.

COLUMN 72

Line 13, "potassium carbonate," should read --potassium carbonate.--.

COLUMN 72

Line 38, "recoding" should read --recording--.

UNITED STATES PATENT AND TRADEMARK OFFICE
CERTIFICATE OF CORRECTION

PATENT NO. : 5,451,251
DATED : September 19, 1995
INVENTOR(S) : KUMIKO MAFUNE, et al.

It is certified that error appears in the above-indentified patent and that said Letters Patent is hereby corrected as shown below:

COLUMN 73

Line 17, "an" should read --and--.

Signed and Sealed this

Thirtieth Day of January, 1996

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,451,251
DATED : September 19, 1995
INVENTOR(S) : KUMIKO MAFUNE, ET AL.

It is certified that error appears in the above-indentified patent and that said Letters Patent is hereby corrected as shown below:

COLUMN 29:

Line 6, change "$HO_3C$" to --$HO_3S$--; and
Line 38, change "$HO_3C$" to --$HO_3S$.

COLUMN 31:

Line 6, change "$HO_3C$" to --$HO_3S$--; and
Line 38, change "$HO_3C$" to --$HO_3S$--.

COLUMN 33:

Line 6, change "$HO_3C$" to --$HO_3S$--; and
Line 38, change "$HO_3C$" to --$HO_3S$--.

UNITED STATES PATENT AND TRADEMARK OFFICE
CERTIFICATE OF CORRECTION

PATENT NO. : 5,451,251
DATED : September 19, 1995
INVENTOR(S) : KUMIKO MAFUNE, ET AL.

It is certified that error appears in the above-indentified patent and that said Letters Patent is hereby corrected as shown below:

<u>COLUMN 35</u>:

Line 3, change "$HO_3C$" to --$HO_3S$--; and
Line 30, change "$HO_3C$" to --$HO_3S$--.

Signed and Sealed this

Seventeenth Day of June, 1997

BRUCE LEHMAN

*Attest:*

*Attesting Officer*

Commissioner of Patents and Trademarks